United States Patent
Farudi et al.

(10) Patent No.: US 12,036,476 B2
(45) Date of Patent: Jul. 16, 2024

(54) TOKEN MANAGEMENT SYSTEM FOR USE IN IMMERSIVE INTERACTIVE SPORTS ENVIRONMENTS

(71) Applicant: Project FANchise Technology, LLC, Hermosa Beach, CA (US)

(72) Inventors: Sohrob Farudi, Temecula, CA (US); Steven Adler, San Diego, CA (US)

(73) Assignee: Project Fanchise Technology, LLC, Hermosa Beach, CA (US)

( * ) Notice: Subject to any disclaimer, the term of this patent is extended or adjusted under 35 U.S.C. 154(b) by 0 days.

(21) Appl. No.: 17/836,682

(22) Filed: Jun. 9, 2022

(65) Prior Publication Data

US 2022/0401842 A1    Dec. 22, 2022

Related U.S. Application Data

(60) Provisional application No. 63/212,036, filed on Jun. 17, 2021.

(51) Int. Cl.
*A63F 13/65* (2014.01)
*A63B 71/06* (2006.01)
(Continued)

(52) U.S. Cl.
CPC .......... *A63F 13/65* (2014.09); *A63B 71/0616* (2013.01); *A63F 13/335* (2014.09);
(Continued)

(58) Field of Classification Search
CPC .......... A63F 13/35; A63F 13/46; A63F 13/65; A63F 13/70; A63F 13/77; A63F 13/79; A63F 13/798; A63F 13/847
See application file for complete search history.

(56) References Cited

U.S. PATENT DOCUMENTS 10,537,807 B2 * 1/2020 Farudi ............... A63B 71/0622
11,638,876 B2 * 5/2023 Farudi ............... A63F 13/847
                                                        463/42
(Continued)

FOREIGN PATENT DOCUMENTS

WO    WO-2019089774 A1    5/2019
WO    WO-2021041457 A1    3/2021
WO    WO-2022265907 A1    12/2022

OTHER PUBLICATIONS

Anonymous: "Smart contract—Wikipedia", Jun. 10, 2021 (Jun. 10, 2021), XP055961635, Retrieved from the Internet: URL: https://en.wikipedia.org/w/index.php?title=Srnart_contract&01did=1027863294.

(Continued)

*Primary Examiner* — Omkar A Deodhar
(74) *Attorney, Agent, or Firm* — Cooley LLP

(57) ABSTRACT

A system and method for managing tokens used in an interactive sports management system enabling remote participation in decisions affecting activity in a sporting event. The interactive system includes a server platform in communication with a blockchain processing network in which are recorded player tokens corresponding to the players. The tokens are respectively implemented by player smart contracts instantiated within the blockchain processing network and executed by a blockchain virtual machine. Results information relating to performances of the players is received by the server platform and stored within a database. A value factor corresponding to an achievement occurrence within the results information associated with a first player is provided to a first player smart contract implementing a first player token associated with the first player. The first (Continued)

player smart contract updates a value of the first player token within the blockchain processing network based upon the first value factor.

12 Claims, 17 Drawing Sheets

(51) Int. Cl.
*A63F 13/335* (2014.01)
*A63F 13/798* (2014.01)
*A63F 13/847* (2014.01)
*A63F 13/812* (2014.01)

(52) U.S. Cl.
CPC .......... *A63F 13/798* (2014.09); *A63F 13/847* (2014.09); *A63F 13/812* (2014.09); *A63F 2300/407* (2013.01); *A63F 2300/558* (2013.01); *A63F 2300/69* (2013.01)

(56) References Cited

U.S. PATENT DOCUMENTS

| | | | | |
|---|---|---|---|---|
| 2018/0345149 | A1* | 12/2018 | Farudi | A63B 71/06 |
| 2019/0130698 | A1* | 5/2019 | Simons | G06F 21/32 |
| 2021/0398395 | A1* | 12/2021 | Rodriquez | G07F 17/3276 |
| 2022/0122072 | A1* | 4/2022 | Kang | G06Q 20/4014 |

OTHER PUBLICATIONS

European Patent Office, International Search Report and Written Opinion for PCT/US2022/032793, dated Sep. 23, 2022, 18 pages.

\* cited by examiner

TOKEN MANAGEMENT SYSTEM FOR USE IN IMMERSIVE INTERACTIVE SPORTS ENVIRONMENTS

CROSS REFERENCE TO RELATED APPLICATIONS

This application claims priority to and the benefit of U.S. Provisional Patent Application No. 63/212,036, entitled TOKEN MANAGEMENT SYSTEM FOR USE IN IMMERSIVE INTERACTIVE SPORTS ENVIRONMENTS, filed on Jun. 17, 2021, the disclosure of which is incorporated herein by reference in its entirety for all purposes. This application is related to U.S. patent application Ser. No. 16/747,074, filed on Jan. 20, 2020, which is a continuation of U.S. patent application Ser. No. 15/859,155, filed Dec. 29, 2017, now U.S. Pat. No. 10,537,807, which claims priority to U.S. Provisional Patent Application No. 62/440,731, filed Dec. 30, 2016, all of which are incorporated herein by reference in their entirety.

TECHNICAL FIELD

This subject matter of this application relates generally to computerized methods and apparatuses, including computer program products, for providing fans with the ability to control live, on-field decision-making for sporting events and other competitions.

BACKGROUND

Sporting events have long been spectator events in which fans watch as spectators, rather than participate as active participants that are able to control, or influence, the gameplay unfolding on the field. Fantasy sports systems enable fans to use their computing devices-such as smartphones and other mobile devices—to select rosters of players who's on-field performance will be attributed to their "fantasy team" for purposes of generating a team score. While such fantasy leagues increase fan interest in the actual sporting events, fan participation and decision-making in such leagues has no bearing on the underlying real-world competitions and sporting events.

Recently, some systems have been introduced that enable a modicum of fan participation in the live, real-time strategy taking place during a sporting event. For example, certain systems allow fans to vote on a strategy decision (e.g., play calling, substitutions) using a limited number of options typically selected in real-time by a coach, and have the 'winning' outcome be relayed to a device operated by the coach on the sideline to implement the strategy. In those systems, however, there are two deficiencies that lead to less-than-optimal engagement with the fan: 1) the coach has tight control over the set of options available for fans to choose from; and 2) the coach retains the ability to use his own judgment to either accept the outcome as voted by the fans or make his own decision that is independent from the fans' choice—thereby limiting the effect that fan decision-making can have on the actual game.

To improve fan participation and interest, a solution to provide a transparent, immersive and interactive sports management experience, in which fan participation can have immediate, real-world effects on the field, pitch, or court, is desired. Transparency in the voting and decision-making process is a key factor to providing a trusted system for fans and for players in the game.

SUMMARY

Therefore, what is needed are methods and systems for interactive sports management that provides an immersive, transparent experience to a plurality of users to participate in various aspects of the management of live-action sports teams comprising a plurality of players. In doing so, the interactive sports management system allows each of the plurality of users to be associated with a team and participate in various decision-making processes of the associated team. It should be appreciated that although the examples provided herein relate to the sport of American football, the systems, methods, and techniques are also applicable to any number of other sports, sports leagues, and/or competitions (e.g., e-sports).

Among other benefits, examples described herein achieve a technical effect of improving user experience associated with supporting a live-action sports team. Various example interactive sports management system described herein enable users (e.g., fans) to be fully engaged, connected, and immersed in the management of their respective teams.

In one aspect the disclosure is directed to a method for managing tokens used in an interactive sports management system enabling remote participation in decisions affecting activity in a sporting event. In the sports management system playcall information pertaining to plays applicable to a current game situation in the sporting event is transmitted to fan computing devices operated by fans and votes for plays are received from each of the fan computing devices. The interactive sports management system determines a selected play based on the received votes plus vote modifiers (aka vote multipliers, of which there may be multiple) and transmits the selected play to one or more participant computing devices associated with at least one of players and coaches involved in the sporting event. The players execute the selected play during the sporting event. The method includes recording, within a blockchain processing network, player tokens corresponding to the players. The player tokens are respectively implemented by player smart contracts instantiated within the blockchain processing network and executed by a blockchain virtual machine. The method further includes receiving results information relating to performances of the players participating in the sporting event. The results information is stored within a database and includes a first achievement occurrence associated with a first player of the players. The first player is associated with a first player token of the player tokens implemented by a first player smart contract. A first value factor corresponding to the first achievement occurrence is provided to the first player smart contract. The first player smart contract updates a value of the first player token within the blockchain processing network based upon the first value factor.

The disclosure is also directed to another method for managing tokens used in an interactive sports management system enabling remote participation in decisions affecting activity in a sporting event in which fan computing devices operated by fans provide information influencing behavior of players involved in the sporting event. The interactive sports management system includes a server platform in communication with a blockchain processing network in which are recorded player tokens corresponding to the players. The player tokens are respectively implemented by player smart contracts instantiated within the blockchain processing network and executed by a blockchain virtual machine. The method includes receiving, by a statistics module of the server platform, results information relating to performances of the players participating in the sporting event. The results information is stored within a database accessible to the server platform. The results information includes a first achievement occurrence associated with a first player of the players; the first player being associated with a first player token of the player tokens implemented by a first player smart contract. The method further includes providing, to the first player smart contract, a first value factor corresponding to the first achievement occurrence. The first player smart contract updates a value of the first player token within the blockchain processing network based upon the first value factor.

The disclosure also pertains to an electronic system for token management for use in an interactive sports management system enabling remote participation in decisions affecting activity in a sporting event in which fan computing devices operated by fans provide information influencing behavior of players involved in the sporting event. The electronic system includes a database and a server platform in communication with a block chain processing network in which are recorded player tokens corresponding to the players. The player tokens are respectively implemented by player smart contracts instantiated within the blockchain processing network and executed by a blockchain virtual machine. The server platform includes one or more hardware processors configured by machine-readable instructions to receive results information relating to performances of the players participating in the sporting event. The processors are further configured to store, within the database, the results information. The results information includes a first achievement occurrence associated with a first player of the players; the first player being associated with a first player token of the player tokens implemented by a first player smart contract. The processor is also configured to provide, to the first player smart contract, a first value factor corresponding to the first achievement occurrence. The first player smart contract updates a value of the first player token within the blockchain processing network based upon the first value factor.

The disclosure, in one aspect, features a system for enabling remote participation in sporting event decision-making. The system comprises a server computing device having a processor and memory. The processor is configured to execute instructions stored in the memory to: receive one or more data elements relating to a current game situation in a sporting event from a remote computing device; retrieve a plurality of plays applicable to the current game situation from a playbook stored in a database, where each play in the playbook is assigned to one or more buckets that define a specific game situation and the server computing device identifies the plurality of plays for retrieval by comparing the current game situation to the specific game situation associated with one or more of the buckets; generate a playcall user interface comprising the plurality of retrieved plays and transmit the playcall user interface to a plurality of fan computing devices associated with fans of the sporting event; receive a vote for one of the plurality of retrieved plays from each of the plurality of user computer devices; determine a selected play of the plurality of retrieved plays based on the received votes; transmit the selected play to one or more player computing devices associated with players involved in the sporting event, where the player computing devices display the selected play to the players and the players execute the selected play during the sporting event; and update, at the remote computing device, the current game situation in the sporting event based upon an outcome of the execution of the selected play.

The disclosure, in another aspect, features a computerized method of enabling remote participation in sporting event decision-making. A server computing device receives one or more data elements relating to a current game situation in a sporting event from a remote computing device. The server computing device retrieves a plurality of plays applicable to the current game situation from a playbook stored in a database, where each play in the playbook is assigned to one or more buckets that define a specific game situation and the server computing device identifies the plurality of plays for retrieval by comparing the current game situation to the specific game situation associated with one or more of the buckets. The server computing device generates a playcall user interface comprising the plurality of retrieved plays and transmitting the playcall user interface to a plurality of fan computing devices associated with fans of the sporting event. The server computing device receives a vote for one of the plurality of retrieved plays from each of the plurality of user computer devices. The server computing device determines a selected play of the plurality of retrieved plays based on the received votes. The server computing device transmits the selected play to one or more player computing devices associated with players involved in the sporting event, where the player computing devices display the selected play to the players and the players carry out the selected play during the sporting event. The current game situation in the sporting event is updated at the remote computing device based upon an outcome of the execution of the selected play.

Any of the above aspects can include one or more of the following features. In some embodiments, the sporting event is an American football game. In some embodiments, the one or more data elements relating to the current game situation comprise down, distance, time remaining, score, or any combination thereof. In some embodiments, the specific game situation assigned to each of the one or more buckets comprises one or more of: down, distance, time remaining, or score. In some embodiments, the server computing device matches at least one of the one or more data elements relating to the current game situation to the specific game situation assigned to one or more of the buckets to identify the plurality of plays for retrieval. In some embodiments, the playcall user interface comprises a display of each of the plurality of retrieved plays in a grid format, and each of the displayed plays is associated with an input that, when selected by a user of the fan computing device, transmits a vote for the displayed play to the server computing device. In other embodiments, the sporting event is an American baseball game. In other embodiments, the one or more data elements relating to the current game situation comprise player at bat, team at bat, runners on base, player pitching, players in field positions, inning, top or bottom of inning, score, or any combination thereof. In other embodiments, the specific game situation assigned to each of the one or more buckets comprises one or more of: player at bat, team at bat, runners on base, player pitching, players in field positions, inning, top or bottom of inning or score. In other embodiments, the server computing device matches at least one of the one or more data elements relating to the current game situation to the specific game situation assigned to one or more of the buckets to identify the plurality of categories of plays and the plurality of plays within those categories for retrieval. In other embodiments, the category selection portion of the playcall user interface comprises a display of each of the plurality of categories of plays in a grid format, and each of the displayed categories is associated with an input that, when selected by a user of the fan computing device, instantiates the play selection portion of the playcall user interface, which comprises a display of each of the plurality of retrieved plays corresponding to the selected category in a grid format, and each of the displayed plays is associated with an input that, when selected by a user of the fan computing device, transmits a vote for the displayed play to the server computing device.

In some embodiments, each of the plurality of fan computing devices comprises a fan profile associated with a user of the fan computing device. In some embodiments, the fan profile comprises a ranking of the associated user. In some embodiments, the ranking of the associated user is based on one or more of: the user's interactions with the server computing device during the sporting event, or the user's interactions with the server computing device during one or more previous sporting events. In some embodiments, determining a selected play of the plurality of retrieved plays based on the received votes comprises: determining a weight for each of the received votes using the ranking of the associated user that submitted the vote; adjusting a value associated with each of the received votes based upon the determined weight for each of the received votes; and identifying a selected play of the plurality of retrieved plays based upon the adjusted values of each of the received votes. In some embodiments, the ranking of the associated user is based on a cryptocurrency token balance associated with the user. In some embodiments, the cryptocurrency token is based upon blockchain technology.

In some examples, the interactive sports management system can manage user profiles, each associated one of the plurality of users. The user profiles store various information pertaining to the corresponding user, including an associated team, a score used to rank the users associated with the team (e.g., a Fan IQ score), a currency balance also used to rank the users associated with the team (e.g., a blockchain-based/cryptocurrency token balance), and historical activity in using or interacting with the interactive sports management system.

In various aspects, the interactive sports management system allows users to contribute to making decisions pertaining to their associated teams. The interactive sports management system can receive user input during the live sporting events and determine real-time decisions (e.g. real-time play calling decisions) pertaining to the team based on the received user input. The input of a user can be weighted by the interactive sports management system based on the user's ranking among users associated with the same team (e.g., fans of the team) in determining the real-time decisions. The system can transmit the real-time decisions to one or more of the plurality of players of the sports team at the appropriate times during the live sporting event (e.g., a certain amount of time before a play is run) such that the players can carry out the determined decision on the field. According to embodiments, real-time play call decisions determined by the interactive sports management system are communicated to the players and coaches of the team via enhanced private networks optimized to reduce latency and delays such that the players and coaches can implement the determined decisions in time on the field.

In certain implementations, the interactive sports management system can be configured to determine a score for each user based on, for example, the user's past activity in interacting with the interactive sports management system. Users of each sports team can be ranked based on their respective scores. The rankings of users associated with a particular sports team can be used to determine the weight assigned to each of the users' input in determining decisions for the team (e.g., a real-time live play calling decision). The input of a user having a higher rank, for example, can have greater weight in determining the decisions compared to a user having a lower rank.

In some examples, the interactive sports management system can determine a ranking score (e.g., a Fan IQ score) and/or a ranking currency balance (e.g., using a blockchain-based token/cryptocurrency token) to rank a corresponding user among a plurality of users (e.g., a plurality of users associated with a particular team or a plurality of users registered with the interactive sports management system). The ranking score can be determined based on the user's knowledge of a sport (e.g., football, baseball, soccer, etc.), which can be measured through the user's interactions with the interactive sports management system. As one example way of determining or updating the ranking score, the user can be presented with a series of questions regarding the sport (e.g., questions regarding formations, play calls, history of the sport, current teams and players, etc.). The user's responses can be used to determine or update the user's score. For instance, incorrect responses to the questions can lower the user's score and correct responses can increase the user's score. In addition to or as an alternative, the interactive sports management system can determine or update the user's ranking score based on the user's input in voting for live play call selections during a live sporting event (e.g., a football game). In some examples, the interactive sports management system can increase the user's ranking score if the user's vote for a live play call selection is ultimately selected. In other examples, the interactive sports management system can determine or update the user's ranking score based on an in-game (e.g., on-the-field) result of the live play call. For instance, the interactive sports management system can increase the user's ranking score in the event that selected live play call results in a positive play on the field.

In other aspects, the interactive sports management system can keep track of in-game statistics pertaining to the user's input in voting for live play calls. The interactive sports management system can keep track of, for instance, a success rate of the user's vote in selecting play calls and in-game statistics resulting from the selection of the user's live play call input (e.g., a number of yards gained, a pass completion percentage, etc.). The interactive sports management system can rank users based on one or more of the tracked in-game statistics (e.g., users having the highest number of yards gained in a game). The interactive sports management system can also update the user's ranking score based on the tracked in-game statistics. In certain implementations, the interactive sports management system can rank the users based on the one or more of the tracked in-game statistics at the end of a sports season (e.g., rank users based on total number of yards gained, etc.).

As an example, during a live football game, the user's vote to select a running play can be ultimately selected by the interactive sports management system as the live play call decision. The user's football team can execute the running play on the field and gain six yards on the play. As another example, during a live baseball game, the user's vote to select a bunt play can be ultimately selected by the interactive sports management system as the live play call decision. The user's baseball team can execute the bunt play on the field and advance the runners into scoring position on the play.

In certain implementations, users can participate in online competitions that result in real-world benefits to their respective teams in live sporting events. For instance, users associated with two teams can compete online to determine real-world bonuses (e.g., bonus timeout, substitution, first down) to be applied during a live sporting event between the two teams.

In some examples, the interactive sports management system can select a number (e.g., ten or fifteen) of users to have greater involvement in the determination of live play calls for the team. In various examples, the selected users can be allowed to use dedicated terminals at a sporting venue (e.g., a stadium or an arena) to participate as "super fans."

In certain embodiments, the interactive sports management system uses a unique cryptographic utility token that drives all decision-making and engagement for active fans of, e.g., a sports league. The token, also called a FAN token, is a cryptographic token for use on the blockchain. The FAN token is the unit of power through which all interactivity is derived. Each fan's level of control is directly proportional to their ownership of FAN tokens, and the skill and frequency with which they engage with the sports league (e.g., via their computing devices) adds to their collection of tokens.

Aside from the practical use case of an easily-transacted utility of power, the cryptographic utility token leverages blockchain technology to bring a level of complete transparency, provided by an ongoing public ledger, to league operations and all fan votes. For fans to buy into the idea of decentralized, fluid decision making power, they need to be confident that their decisions yield the results they expect. The blockchain and ledger are the key to unlocking that democratization and providing trust in the system for all parties involved.

While FAN tokens are a literal measure of influence to a fan's voting power, whether it be for calling a play or selecting a new quarterback, the tokens also carry utility indirectly tied to league operations. FAN tokens enable fans to unlock tiers of access to content, voting rights, exclusive experiences with the league and its sponsors, merchandise, and, of course, the potential for a greater piece of the championship purse. In addition to purchasing FAN tokens in the token sale, fans are able to earn FAN tokens through a variety of reward-based programs designed to enhance fan involvement and engagement with the sports league.

Every aspect of fan engagement in the interactive sports management system is driven by the FAN token. An individual fan's power to influence their team's crucial decisions from making draft choices and free agent signings to in-game, real-time play calls—increases as their FAN token ownership increases. Holding certain amounts of FAN tokens also grants access to unique content, special perks, prizes, discounts and other FAN token-only rewards.

It should be appreciated that fan-engagement opportunities will continue to grow as public buy-in and audiences increase, and as technology continues to democratize access even beyond sports. Some benefits of owning FAN tokens include, but are not limited to:

Increased Coaching Power—Each team has a FAN token leaderboard which ranks fans from top to bottom. Coaching power for each team is distributed across the team's respective leaderboard with the fans in the top spots having the greatest amount of influence, and the fans at the bottom having the least. Leaderboard rankings are determined based on a number of factors including, but not limited to, the total amount of FAN tokens owned, total amount of FAN tokens earned in a specified time period, and offensive and defensive statistics accumulated when fans call successful plays for their team.

Individual Play Calling—Imagine sitting on your couch watching the game and receiving a notification on your phone that "You, and you alone, are calling the next play!" Multiple times per game individuals and small groups of FAN token holders are selected to call a play—providing an opportunity to be the team's sole Offensive Coordinator for that play. Here again, blockchain transparency is essential in fans' confidence that the play they call is the play on the field.

Wagering—The methods and systems described herein can leverage peer to peer wagering functionality. Tremendous momentum and precedent has already been created by decentralized prediction markets such as Augur, Gnosis and Stox.

Championship Prizes—For example, a championship game in a particular sports league can have a minimum, large dollar prize (e.g., $1 M) on the line. Players and coaches of the winning team share in 50% of the prize pool. Certain fans of the team that wins the championship game also share in 50% of the championship prize, allocated across a number of categories including, but not limited to: number of successful plays called, passing yards gained, rushing yards gained, and touchdowns scored.

VIP Tiers—VIP tiers based on FAN token ownership include complimentary VIP tickets to games, special seating and in-venue access for FAN token holders, free Virtual Front Office subscriptions, unique in-app avatars, invites to exclusive events, first to know breaking news, and more.

Rewards & Prizes—FAN token owners are eligible to win prizes and rewards via sweepstakes. Sweepstakes prizes range from team merchandise and game consoles to one-of-a-kind fan experiences and travel packages to see a game in person. For example, sweepstakes can be held at least once a month during the season, with each FAN token providing an entry into the random drawing. In certain embodiments, in order to be eligible for the sweepstakes, fans must have been active in the interactive sports management app during the week prior to the drawing.

Play-Calling Win Bonus—During each game of the season, the fans of the winning team who called plays and participated during the game receive FAN tokens.

Discounts—Special FAN token-only discounts on merchandise, tickets, fan experiences, in-app purchases, and more. Discounts are tiered with the highest discounts reserved for the very top FAN token owners and earners.

In-App Purchases—FAN tokens can be used to purchase "voting boosts," game-day experiences, limited-edition merchandise, Virtual Front Office access, and more.

Future Token Issuances—If in the future a particular sports league or competition issues tokens with broader rights than FAN tokens, including, for example, tokens that confer ownership in and/or control over the teams in the sports league, the sports league can provide holders of FAN tokens priority access to the purchase of such tokens.

Fans can earn FAN tokens by engaging with the interactive sports management system at a variety of touch points, including:

Watching games;

Calling plays and accumulating offensive and defensive stats e.g. passing yards, rushing yards, touchdowns, and sacks;

Viewing written and streaming video content on the league's website and mobile app;
Participating in polls and team coaching decisions such as drafting players and setting the week's starting lineup;
Maintaining an active Virtual Front Office subscription;
Providing value-added activities to teams such as scouting players and helping coaching staffs evaluate opponents;
Referring friends and family to join the league's fan base;
Engaging with league sponsors;
Creating league-related content including blog posts and videos;
User-generated opportunities.

In certain embodiments, various cryptographic utility tokens in the form of non-fungible tokens, or NFTs, can be awarded to fans by the interactive sports management system or purchased by fans from the interactive sports management system. Such NFTs issued by the interactive sport management system, which also referred to herein as "Tokens", can be implemented using cryptographic smart contract technology. In one embodiment, the Tokens will adhere to the ERC-721 standard. Each Token will have a rarity (e.g. common, uncommon, rare, legendary), or limited supply—each with a different visual element to display their rarity tier determined at the time of creation (aka minting). The monetary value of the Token is determined by a combination of factors that include its rarity and the perceived desirability of the Token by the fans. Tokens can be traded and bought or sold in existing NFT marketplaces. As is discussed below, Tokens can also be "burned" by their owner (i.e., permanently removed from circulation) in order to redeem their monetary value. Such burning of Tokens may be accomplished in a conventional manner by, for example, transferring the Tokens to irretrievable public wallet and reflecting and publishing the status of the burned tokens on the blockchain utilized by the interactive sports management system.

One specific example of a type of Token which may be offered to fans by the interactive sports management system is a Player Token. When a Player joins a league, the interactive sports management system may mint Player Tokens of differing rarities for that Player. In implementations utilizing an Ethercum blockchain, each Player Token may comprise an NFT comporting with ERC-721. A percentage of the Player Tokens may be given to each and any of:
the Player;
the league;
the team that signs player; and/or
the Fans.

Additionally, when a team signs a player, the deal may include the purchasing of some of the Player Tokens from the league. Player Tokens may also be available for purchase by Fans in randomized packs. In one embodiment the Player Token for a given Player will have a limited circulation. For example, the Player Token for a given Player may have a specified rarity ranging from, for example, 1 of 1, ultra-rare, rare, uncommon and common, each with a different visual element to display their rarity tier. In addition to the collectible aspect of Player Tokens, holders of Player Tokens will also be able to earn rewards based on the accomplishments of each Player. In one embodiment the distribution of such rewards will be in FAN tokens and will be distributed as follows: a percentage of the total reward will be distributed directly to the Player Token holders in proportion to the number of Tokens they hold of that player. The remaining percentage will be held in a Player Token Rewards Pool specific to each player. The option is available to Player Token holders to burn (i.e., destroy) their Player Tokens to receive a proportional share of the rewards in the specific Player Token Rewards Pool. Each Player Token that is burned reduces the outstanding supply of that Player's Player Tokens, leaving each remaining Player Token of that Player to share in a greater percentage of future rewards. In the situation of a player becoming injured or leaving a league. Player Token holders will be able to withdraw the value of their Player Tokens in escrow.

In addition. Player Tokens may also provide other benefits to Fans who hold them in their crypto wallet or other Token storage construct. As an example:
if Team A is engaged in playing a football game against an opponent; and
Fan Y owns some number of Team A's quarterback Player Tokens; then
when Team A's quarterback is on the field, Fan Y's Coaching Power (defined by the number of play call determination votes attributed to Fan Y) may be increased by a factor or increment X whenever Fan Y calls a passing play.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 7-9 are data flow diagrams illustrating exemplary mechanics for Token interlocking and disconnection and for increasing Token efficacy, in accordance with an embodiment.

DETAILED DESCRIPTION

Overview of Interactive Sports Management System

Figure 1:
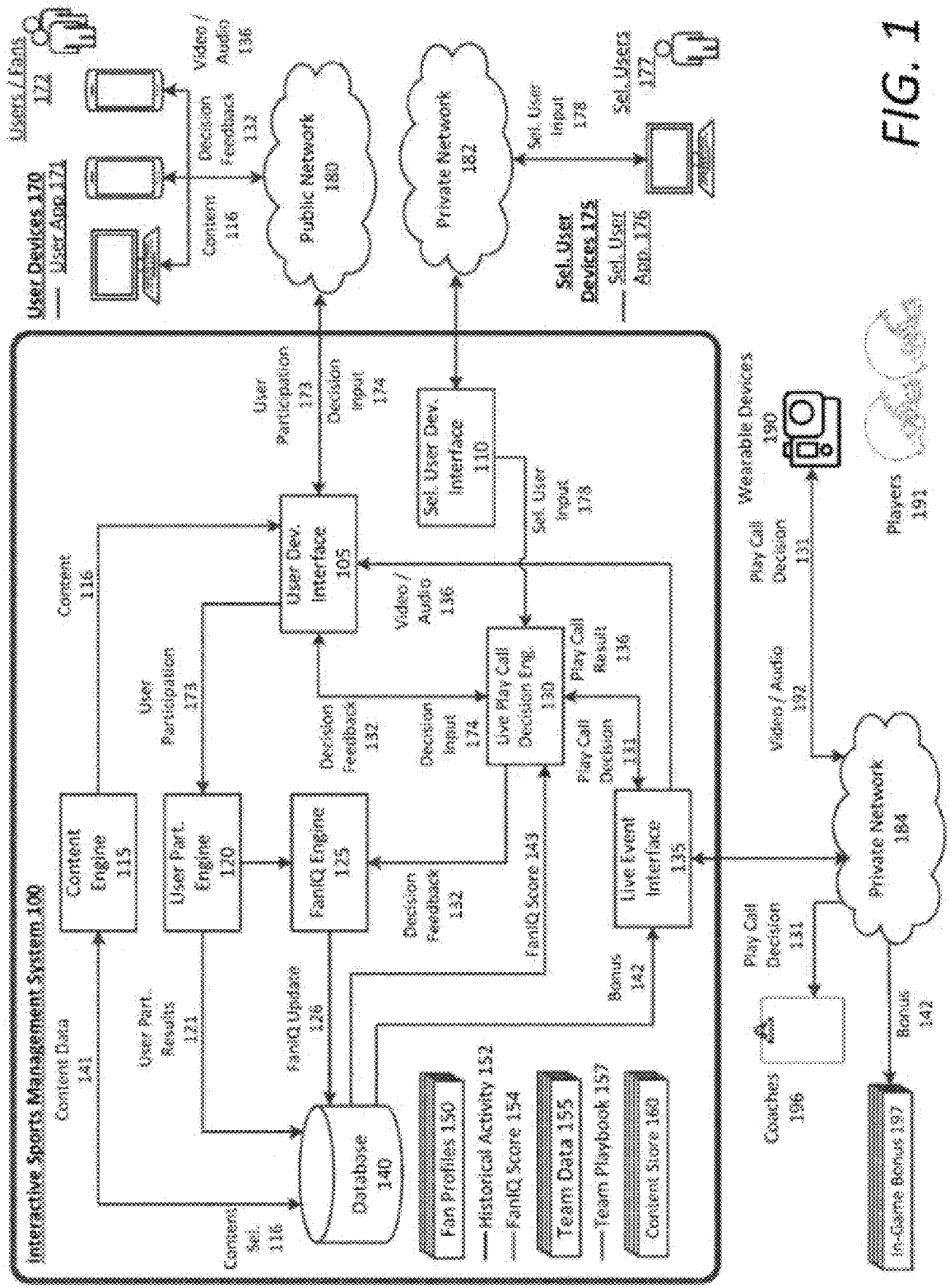
FIG. 1 is a block diagram illustrating an example interactive sports management system in communication with user devices.

FIG. 1 is a block diagram illustrating an example interactive sports management system in communication with user devices. In examples described herein, the interactive sports management system 100 allows users or fans 177 to participate in the management of a live-action sports team in an immersive manner, including making real-time decisions that affect the outcome of the sporting events (e.g., football, baseball, basketball, soccer, hockey etc.). In various aspects, through the use of the interactive sports management system 100, users/fans associated with a team 172 can provide input regarding various decisions pertaining to the team (e.g., live play calling decisions, team playbook management, team personnel management, etc.). The interactive sports management system 100 receives the inputs and generates a decision based, at least in part, on each user's 172 input and the respective rankings of the user 172 among users associated with the team based on, for example, a Fan IQ score and/or FAN token balance. In some examples, a number of users 172 can be chosen (e.g., based on the Fan IQ score and/or FAN token balance) as selected users 177 to perform enhanced roles in one or more decision-making processes for the team (e.g., live play calling).

According to embodiments, interactive sports management interactive sports management system 100 can include a user device interface 105, a selected user interface 110, a content engine 115, a user participation engine 120, a Fan IQ engine 125, a live play call decision engine 130, a live event interface 135, and a database 140. The interactive sports management system 100 communicates with user devices 170 of users/fans 172 that execute or run user application 171 over a network 180 (e.g., the Internet). During a live sporting event, the interactive sports management system 100 can communicate with coaches 196 and wearable devices 190 of players 191 of a sports team over a private network 184. In some examples, the interactive sports management system 100 also communicates with selected user devices 175 of selected users 177 that execute or run selected user applications 176 over a private network 182. The private networks 182 and 184 can be the same network or can be disparate private networks.

In various aspects, the interactive sports management system 100 includes a user device interface 105 to communicate with user devices 170 operated by users or fans associated with a team 172 over a network 180. The user devices 170 execute or run user applications 171 that provide one or more user interfaces to the users 172 to interact with the interactive sports management system 100. For instance, the user application 171 can provide the users 172 a user interface to provide input regarding decisions for a particular sports team, or a user interface to review plays and learn about the sport. The network 180 can be the Internet, for example. The user device interface 105 can receive user participation 106 and decision input 107 from the user devices 170.

According to various implementations, the interactive sports management system 100 includes a content engine 115 that generates content for display on user devices 170. The content engine receives content data 141 from database 140 (e.g., a content store 160) to generate content 116, which is transmitted to the user devices 170 via the user device interface 105 and public network 180. Content 116 can include a user interface to provide a user input for a decision pertaining to the team (e.g., a live play call decision, team playbook management, team personnel management, etc.), a user interface to participate in fan-based contests (e.g., a trivia contest), content pertaining to learning about the sport and/or the team (e.g., videos, tutorials, guides, etc.), live game score content (e.g., scoreboard, box score, real-time statistics etc.), content to view information pertaining to the team and/or a league in which the team competes (e.g., league or team news, table standings, player or team statistics), and the like.

For instance, the content engine 115 can generate content 116 such as a user interface allowing a user to provide input for a live play call decision during a live sporting event (e.g., an American football game). A figure illustrating a screenshot of an exemplary user interface for providing a user input for a live play call decision is depicted in FIG. 3A. The content 116 in this context can include a number of play call choices (e.g., selected from the team play book 157 in the database 140) displayed to the user 172 on user device 170. The play call choices can be selected from the team play book 157 based on an in-game situation during the live sporting event. For example, the content engine 115 can select a number of passing plays for display to users 172 based on a third-and-long situation in a football game.

In certain implementations, the content engine 115 can generate content 116 to allow the users 172 to participate in various other aspects of the management of the team. For example, the content engine 115 can generate content 116 to allow users 172 to provide input or vote for the team's player personnel decisions (e.g., draft a player or trade a player). The content engine 115 can also generate content 116 to allow users 172 to interact with coaches 196 to create or modify playbooks for the team 157. The team playbooks can be stored in database 140 as team data 155.

Additionally, the content engine 115 can generate content to provide users 172 with scores, updates, and/or news regarding the users' teams or the league in which the users' teams compete. The content engine 115 can also generate content pertaining to user competitions (e.g., a trivia competition) held before live sporting events to determine, for example, real-world bonuses (e.g., extra timeouts) for the users' teams. For instance, a team's users can win a user competition held before a football game to give the team additional timeouts during the football game.

In certain implementations, the interactive sports management system 100 further includes a user participation engine 120 which receives user participation 173 from user devices 170 via public network 180 and user device interface 105. In various aspects, the user participation 173 can include user activity pertaining to user competitions. In other examples, the user participation 173 can correspond to user activity on forums, chat groups, blackboards or other user venues included or provided by the interactive sports management system 100. Furthermore, the user participation 173 can include user input regarding team personnel decisions (e.g., draft a player or trade a player). The user participation engine 120 generates user participation results 121, which can be stored in the database 140 (e.g., as historical activity 152 of fan profile 150). As one example, user participation results 121 regarding a user competition can be stored in the database 140. The user participation results 121 for the user competitions can be used to determine bonuses 142 for teams during competitions.

In some examples, the interactive sports management system 100 includes a Fan IQ engine 125 to compute a metric or a score (e.g., a Fan IQ score) for each of the users of the system, the score being used to rank users associated with a team to, for example, assign a respective weight to each users' input in determining a decision pertaining to the team (e.g., a play calling decision). The ranking of a user among users associated with the same team (e.g., the team's user or fan base) can be used to determine the weight of the user's input in determining decisions pertaining to the team. The Fan IQ score for a particular user can be determined or updated based on the particular user's activity or interactions with the interactive sports management system. According to embodiments, a Fan IQ score for a particular user can be indicative of the particular user's knowledge of the sport, knowledge of the team, involvement in the team's management, etc. For instance, the interactive sports management system 100 can reward user activity that increases a user's knowledge of the sport or the team (e.g., studying the team's playbook 157 and watching video replays) and such activities may be incentivized by the interactive sports management system 100 to increase a user's Fan IQ score. As another example, a particular user's Fan IQ score can vary depending on how the particular user votes for live play calls during a game via, for example, decision feedback 132. The live play call decision engine 130 can generate decision feedback 132 to indicate how a particular user voted in comparison with other users associated with the team. For instance, if the particular user consistently votes for plays that are ultimately selected as the play call decisions 131, the particular user's Fan IQ score can be increased as a result. On the other hand, if the particular user consistently votes for plays that are not selected as the play call decisions 131, the particular user's Fan IQ score can be decreased (or remain unchanged) as a result. The Fan IQ engine generates a Fan IQ update 126 to update a Fan IQ score 154 stored in the fan profile 150 of the corresponding user. In addition to or as an alternative, the Fan IQ score 143 can be updated or determined based on an in-game (e.g., on-the-field) result of the selected play call decision 131. For instance, Fan IQ engine 125 can receive decision feedback 132 that includes an in-game result of a selected play call (e.g., gain of six yards). In response, the Fan IQ engine 125 can generate Fan IQ update 126 to update each the Fan IQ scores of each of the users that voted for the selected play call based on the in-game result. For instance, a user 172 can submit a decision input 174 for a "Screen Pass" play. The interactive sports management system 100 can select the "Screen Pass" play as the play call decision 131 based on input from a plurality of users. After the "Screen Pass" play is executed on the field by the team, the interactive sports management system 100 can generate a feedback such as decision feedback 132 to indicate an in-game result of the "Screen Pass" play (e.g., gain of six yards). The feedback, including the result of the "Screen Pass" play can be received by the Fan IQ engine 125 to update the Fan IQ score of the user 172.

In certain implementations, the interactive sports management system includes a live play call decision engine 130 to generate a play call decision 131 based on received user input (e.g., decision input 174). In various examples described herein, the play call decision 131 can be a direction for the team and its players to execute a plan of action or a strategy during the live sporting event. The play call decision 131 can specify a formation, a route, a player substitution, and the like. For example, in the context of a football game, the play call decision 131 can be a specific pass play (e.g., a slant or a post), a specific run play (e.g., a run up the middle), a defensive scheme (e.g., a pass rush, a zone coverage), etc. The play call decision 131 can be generated based on decision input 174 from users 172 associated with the team. For example, for a particular in-game situation, users 172 can submit input regarding the play call decision 131 using respective user devices 170 (e.g., content pertaining to the play call decision 131 can be generated by content engine 115). The users 172 can be given a window of time (e.g., ten seconds) to submit input regarding the play call decision 131. Decision input 174 submitted during the window of time will be taken into account in generating the play call decision 131 by the live play call engine 130. Any decision input 174 submitted outside the window of time will not be taken into account in generating the play call decision 131.

According to embodiments, the live play call engine 130 determines the play call decision 131 based on the received user decision input 174. The live play call engine 130 can, for example, selects the play call with the most user votes as the play call decision 131. In certain implementations, the live play call decision engine 130 can assign a weight to each user decision input 174 to generate the play call decision 131. For example, each user decision input 174 can be multiplied by a weighting factor in the determination of the play call decision 131. In some examples, the live play call engine 130 receives a metric or a score such as Fan IQ score 143 associated with each user 172. The Fan IQ score 143 of a particular user 172 can be used to determine the weight assigned to the particular user's 172 decision input 174 in generating the play call decision 131. As described herein, the Fan IQ score 143 can be used to rank users 172 associated with a particular team. A decision input 174 from a user 172 with a high Fan IQ score 143 can be weighted more heavily (e.g., receives a higher weighting factor) than a decision input 174 from a user 172 with a low Fan IQ score 143. In this manner, the live play call decision engine 130 can generate the play call decision 131 by taking into account each participating user's experience, knowledge, and or prior participation levels, as embodied each participating user's respective Fan IQ score.

In certain implementations, the live play call decision engine 130 receives selected user input 178 from selected user devices 175 operated by selected users 177 via selected user device interface 110. Selected users 177 can be a selected number (e.g., five or ten) users 172 who are chosen to have greater involvement in the determination of play call decisions 131 during a live sporting event. The selected users 177 can be chosen based on their respective Fan IQ scores. For instance, users 172 with the highest Fan IQ scores can be chosen to be the selected users 177. The selected users 177 can also be chosen as prizes for user competitions. In certain implementations, the selected users 177 can be chosen by one or more criteria relating to the users' historical interactions with the interactive sports management system 100. For instance, users 172 who are most active in interacting with the interactive sports management system 100 over a specific period (e.g., a week or two weeks) can be chosen as selected users. In various aspects, the interactive sports management system 100 can select users on a periodic basis (e.g., before each live sporting event, every week, etc.). The selected user devices 175 may be located at the venue of the sporting event (e.g., inside a stadium or arena) and may communicate with the selected user device interface 110 via a private network 182 (e.g., private wireless network), which may be optimized to reduce latency, delay, and/or interference and maximize reliability. Furthermore, the selected user devices 175 can be dedicated terminals or devices executing selected user applications 176 to allow the selected users 177 to provide the selected user input 178.

According to embodiments, for a certain percentage of instances (e.g., 75% or 80% of instances) the live play call decision engine 130 can generate the play call decision 131 based on selected user input 178. For the remaining percentage of instances (e.g., 25% or 20% of instances) the live play call decision engine 130 can generate the play call decision based on user decision input 174. For instance, the interactive sports management system 100 and content engine 115 can be configured such that for 80% of play calls, the selected users 177 are presented with user interfaces to provide selected user input 178, while the users 172 are not. For the remaining 20% of play calls, the content engine 115 provides content 116 to the users devices 170 to allow users 172 to provide user decision input 174 such that the live play call decision engine 130 can generate play call decisions 131 based on the user decision input 174. In other implementations, the live play call decision engine 130 can generate a play call decision 131 based on a combination of the user decision input 174 and the selected user input 178. For instance, the user decision input 174 can be used to determine two plays from the team's playbook 157 to run and the selected user input 178 can be used to choose one of the two plays as the play call decision 131. In certain examples, the interactive sports management system 100 can be configured to reserve certain play call decisions (e.g., last two minutes of a game) to either users 172 or selected users 177.

In certain implementations, the live play call decision engine 130 receives play call result 136 from the live event interface 135. The play call result 136 can indicate an in-game (e.g., on-the-field) result of the selected play call (e.g., as indicated by play call decision 131) after it is executed by the players 191 and/or coaches 196 during the live sporting event. The play call result 136 can indicate, for example, that the selected play call resulted in a gain of six yards for the team. The live play call decision engine 130 can generate the decision feedback 132 to include the play call result 136 such that the Fan IQ engine 125, which receives the decision feedback 132, can update the Fan IQ scores of the users that voted for the selected play call based on the play call result 136. In other examples, live play call decision engine 130 can update the fan profiles 150 based on the play call result 136. For example, a user profile of a user who voted for the selected play call can be updated to include the play call result 136. In this manner, the interactive sports management system 100 can keep track of in-game statistics (e.g., yards gained, points scored, runs batted in, etc.) for each of the users based on in-game results of plays for which they voted. In various aspects, the interactive sports management system 100 can rank the users according to such in-game statistics. Such a ranking based on in-game statistics can be updated in real-time during a live sporting event. The interactive sports management system 100 can also maintain and update such in-game statistics for each user over the course of a sports season. In this manner, the users can be ranked, for example, on a cumulative number of yards gained or a cumulative number of points scored over the course of a season.

According to embodiments, the interactive sports management system 100 can include a live event interface 135 to communicate with players 191 and coaches 196. In some examples, the live event interface 135 communicates with wearable devices 190 of players 191 to communicate play call decision 131. For example, the wearable devices 190 can display the play call decision 131 such that the players 191 can execute the selected play during the game. Furthermore, the wearable device 190 can include one or more cameras and a microphone to transmit video/audio data 192 to interactive sports management system 100. The live event interface 135 can transmit the video/audio data 192 to user device interface 105 such that user devices 170 can receive one or more live video/audio feeds from the players 196. In certain implementations, the users 172 can select among a plurality of video/audio feeds from players 191 (e.g., one video/audio feed per player on the field) and from coaches 196. In various examples, a private network 184 connects the live event interface 135 with coaches 196, players 191, and the wearable devices 190. The private network 184 (e.g., a private wireless network) can be optimized to reduce latency, delay, and/or interface and maximize reliability.

The live event interface 135 can also receive a bonus 142 from the database 140. The bonus 142 can represent a bonus or reward given to a team based on participation by the team's associated users in various contests or competitions (e.g., online trivia competition etc.). The bonus 142 can represent an in-game and on-field bonus such as an additional timeout, an additional first down, etc. The live event interface 135 can communicate the bonus 142 to the sporting event venue as in-game bonus 197. According to embodiments, the in-game bonus 197 can be viewed by the players 196, coaches 191, users 172, selected users 177, and other spectators of the live sporting event.

Methodology

Figure 2:
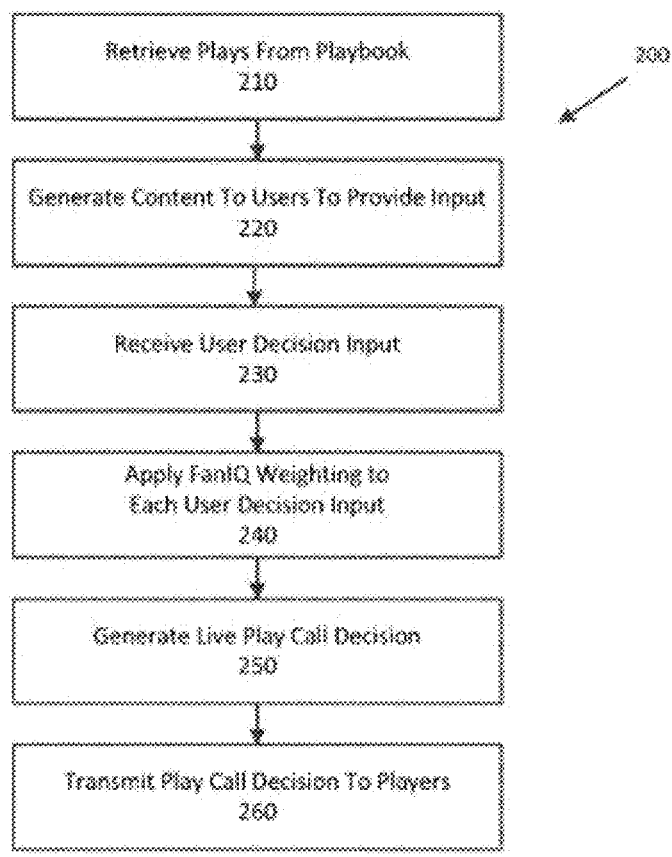
FIG. 2 is a flow chart describing an example method of generating a live play call decision by an example interactive sports management system.

FIG. 2 is a flow chart describing an example method of generating a live play call decision by an example interactive sports management system, according to examples described herein. In the below discussion of the FIG. 2, reference may be made to reference characters representing like features as shown and described with respect to FIG. 1. Furthermore, the processes described with respect to FIG. 2 may be performed by an example interactive sports management system 100 as shown and described with respect to FIG. 1. Referring to FIG. 2, the interactive sports management system 100 can perform process 200 to determine a live play call decision (e.g. play call decision 131) during a live-action sporting event (e.g., a football game). The interactive sports management system 100 retrieves a number of plays from a particular team's playbook (e.g., playbook 157) for presentation to users (210). For instance, the interactive sports management system 100 can select four or six plays for presentation to users 172 such that the users 172 can provide their input in selecting one of the plays. The selection of plays from the playbook can be based on a current situation pertaining to the live-action sporting event (e.g., a third-and-four situation). For instance, on a third-and-long situation, the interactive sports management system 100 can be configured to select a number of passing plays.

It should be appreciated that, in some embodiments, the interactive sports management system 100 structures a team's playbook 157 according to situational buckets (e.g., parameters like down and distance, time on the clock, score, and the like) in order to quickly and efficiently select a number of plays that are most relevant or applicable to the game situation. In one embodiment, a coach of the team uploads his or her entire playbook to the database 140, and the interactive sports management system 100 automatically allocates each play to one or more situational buckets as described above. In addition, the coach (or in some embodiments, the interactive sports management system 100) can assign each play a ranking or weight (e.g., 0-100) in each bucket, which indicates a certain priority for the play. For example, a play with a higher ranking in a certain bucket may be displayed to the users for selection more often than a play in the same bucket that has a lower ranking. In this way, the present interactive sports management system 100 is particularly advantageous over certain existing sports management systems, because there is no delay from having a coach determine which number of plays should be displayed to the users at the time the play must be called in the game.

In addition, in some embodiments, the plays in each bucket can further be associated with one or more categories associated with the play. Exemplary categories can include, but are not limited to, a degree of difficulty or complexity of the play (e.g., trick play, double lateral), a type of the play (e.g., pass vs. run), a formation or personnel grouping that executes the play (e.g., four wide receivers, I-formation, man in motion, special teams, etc.). It should be appreciated that other categories can be contemplated within the scope of the technology described herein.

The interactive sports management system 100 generates content (e.g., a user interface) for providing a user input for a live play call decision, including the selected number of plays from the playbook (220). The generation of content can be performed by, for example, the content engine 115. A figure illustrating a screenshot of an exemplary user interface for providing a user input for a live play call decision is depicted in FIG. 3A. The generated content (e.g. content 116) can be transmitted to user devices 170 via user device interface 105. The generated content can then be displayed by the user devices 170 for presentation to the users 172.

The interactive sports management system 100 receives user decision input (e.g., decision input 174) from each of the users 172 associated with the team. According to embodiments, each user 172 provides user decision input by selecting one of the plays presented on the user device 170. In various examples described herein, the interactive sports management system 100 permits users 172 to submit play selection within a given window of time (e.g., ten seconds). Input submitted during the window of time can be taken into account to generate the play call decision 131. Input submitted outside the window of time may be discarded and/or ignored by the interactive sports management system 100. In this manner, the live sporting event can be maintained without significant disruptions caused by the user input for play call decisions.

According to embodiments, the interactive sports management system 100 applies Fan IQ weighting to each user decision input (240). The interactive sports management system 100 can retrieve a Fan IQ score or a rank of each of the users associated with the team and can be configured to weigh each user's decision input based on the corresponding Fan IQ score or user ranking. For instance, the interactive sports management system 100 can multiply each user input by a weighting factor to take into account the Fan IQ score or ranking of each user. Subsequently, the interactive sports management system 100 generates a live play call decision (250) and transmits the play call decision to players (260) such that the play call can be implemented by the players during the live sporting event.

Exemplary User Interface

Figure 3B:
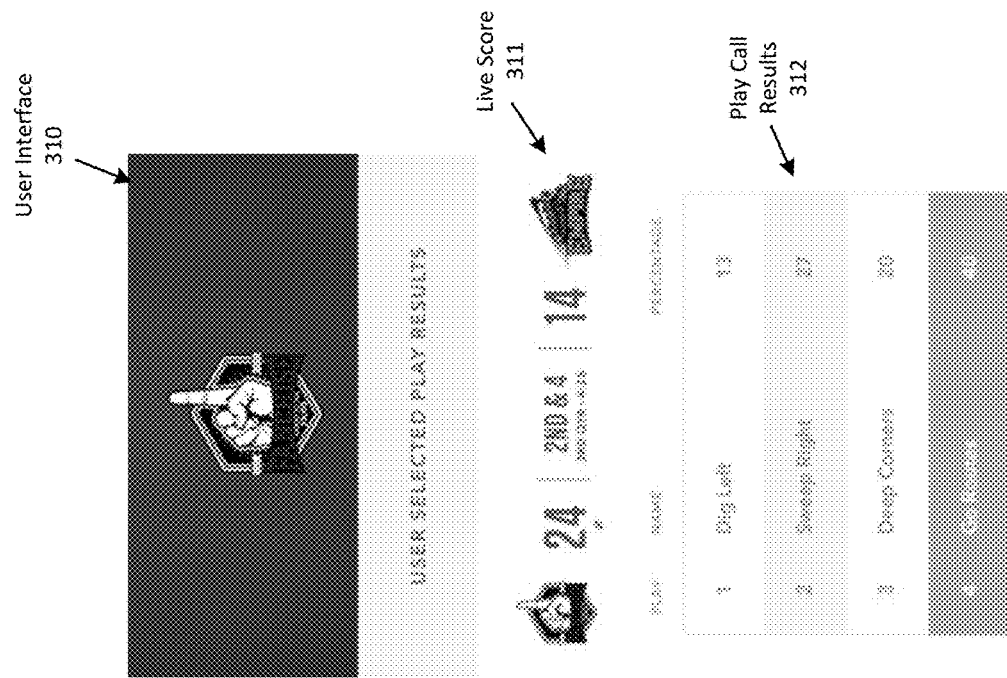
FIGS. 3A-3F illustrate example screenshots of a user interface on a user device.
Figure 3A:
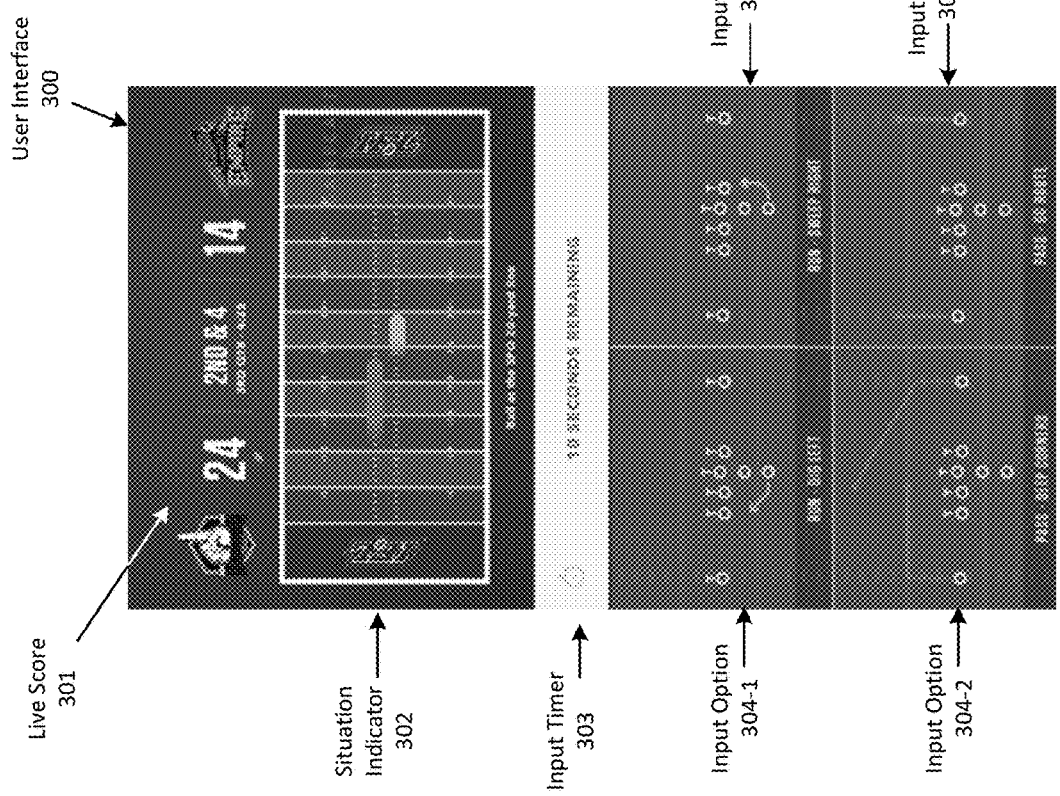

FIGS. 3A-B illustrate example screenshots of a user interface on a user device, according to examples described herein. In the below description of FIGS. 3A-B, reference may be made to reference characters representing like features as shown and described with respect to FIGS. 1-2. FIG. 3A illustrates an example screenshot of a user interface 300 for providing a user play call decision input (e.g., decision input 174). The user interface 300 includes a live score 301 illustrating a current live score between opposing teams in a live sporting event. In this case, the live score 301 illustrates a score for a football game. The user interface 300 also includes a situation indicator 302. The situation indicator 302 includes an in-game situation (e.g., "Ball at the SPO 20-yard line") and a graphic illustrating the status of the current drive. The user interface 300 further includes an input timer 303 (e.g., "10 seconds remaining"). The input timer 303 informs the user 172 that the user 172 has a certain amount of time remaining to input a selection. Inputs made before the input timer 303 expires will be taken into account in generating a live play call. Inputs made after the input timer 303 expires will be discarded or ignored. The user interface 300 further includes four plays selected from the team's play book based on the current in-game situation, including input options 304-1 ("Run-Dig Left"), 304-2 ("Pass-Deep Corners"), 304-3 ("Run-Sweep Right"), and 304-4 ("Pass-Go Route"). The user 172 can select one of the input options 304-1, 304-2, 304-3, or 304-4 by clicking, tapping, or touching the input option areas on the screen of the user device 170.

FIG. 3B illustrates an example screenshot of a user interface 310 informing the user of a play call decision generated by the interactive sports management system 100. The user interface 310 includes a live score 311 that informs the user 172 of the current score of the football game. The user interface 310 also includes play call results 312. The play call results 312 displays each of the four plays presented to the users as input options 304-1, 304-2, 304-3, and 304-4. The play call results 312 also displays a percentage of users who voted for each of the plays as well as the generated play call decision. In this instance, 40 percent of the users selected Go Routes (input option 304-4), which was the generated play call decision.

Figure 3C:
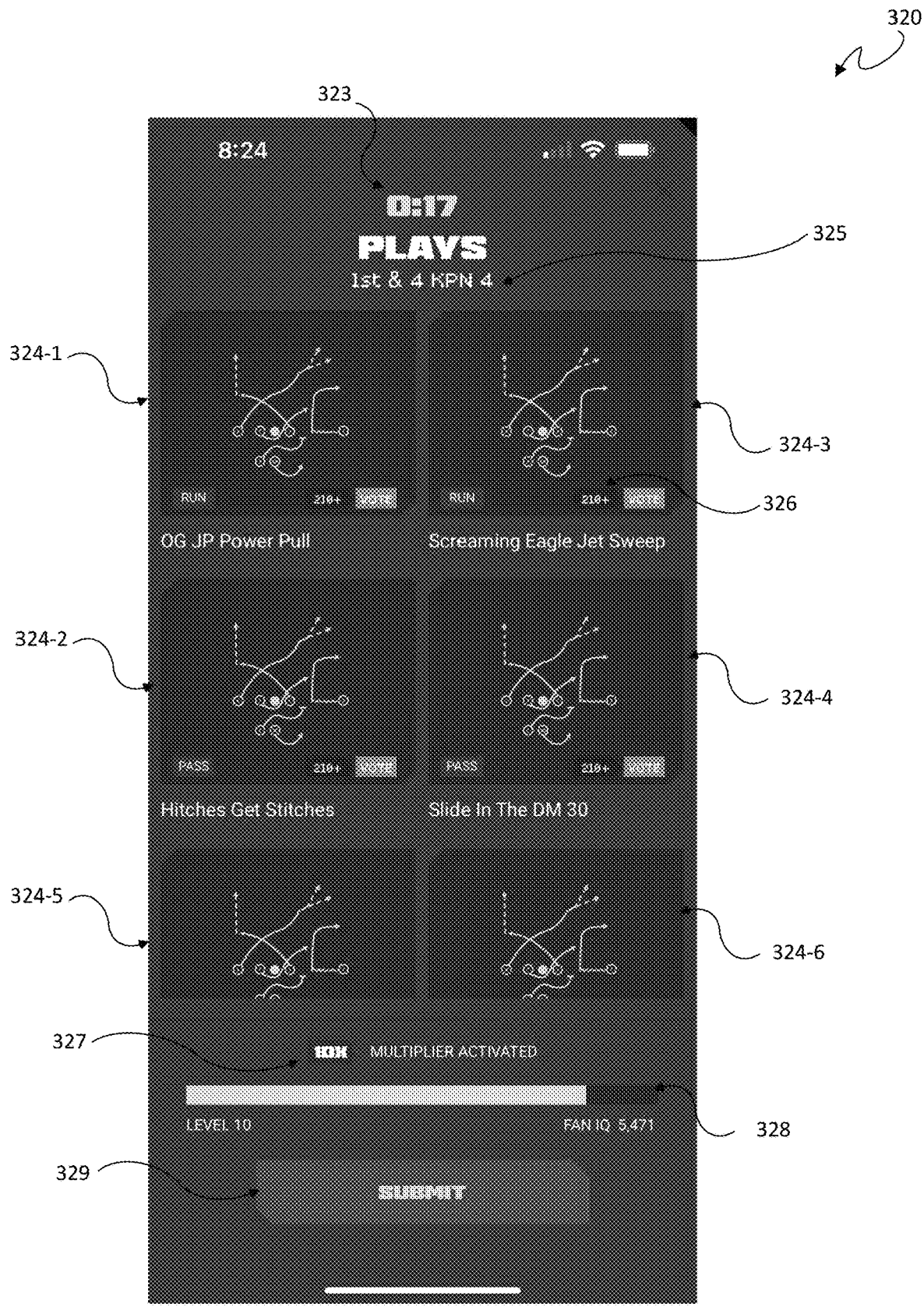

FIG. 3C illustrates an example screenshot of an alternate user interface 320 for providing a user play call decision input (e.g., decision input 174). The user interface 320 includes an input timer 323 (e.g., "0:06"). The input timer 323 informs the user 172 that the user 172 has a certain amount of time remaining to input a selection. Inputs made before the input timer 323 expires will be taken into account in generating a live play call. Inputs made after the input timer 323 expires will be discarded or ignored. The user interface 320 further includes Game Situational Data 325 received from an interactive sports management system server, which specifies the down, distance and filed position of the play to be call. In other embodiments, the game situational data 325 may also include the time remaining in the current period of play and the game score. The user interface 320 further includes diagrams of plays 324 selected from the team's play book based on the current in-game situation. The user 172 can select one of the plays 324 by clicking, tapping, or touching the input option areas on the screen of the user device 170 and records their play call selection with the interactive sports management system by selecting the Submit Button 329. Alternatively, if a user selects one of the plays 324, but does not subsequently select the Submit Button 329 before the input timer 323 expires, the user interface 320 will record the user's vote automatically to the interactive sports management system. Each play diagram 324 may optionally include an ability play call vote multiplier 326 which indicates a multiplication factor conveyed to the user's vote by the presence of one or more specific Gear Tokens, or other blockchain Token Items, being bound to the Player Token and a particular game situation. This vote multiplication factor is known as an Ability. The user interface 320 further includes a fan level play vote multiplier 327 which is determined by the fan's level as indicated by the fan level gauge 328. Together the ability play call vote multiplier 326 and the user level play vote multiplier 327 are added together by the interactive sports management system to determine the total vote multiplier for the user's play call vote.

Figure 3D:
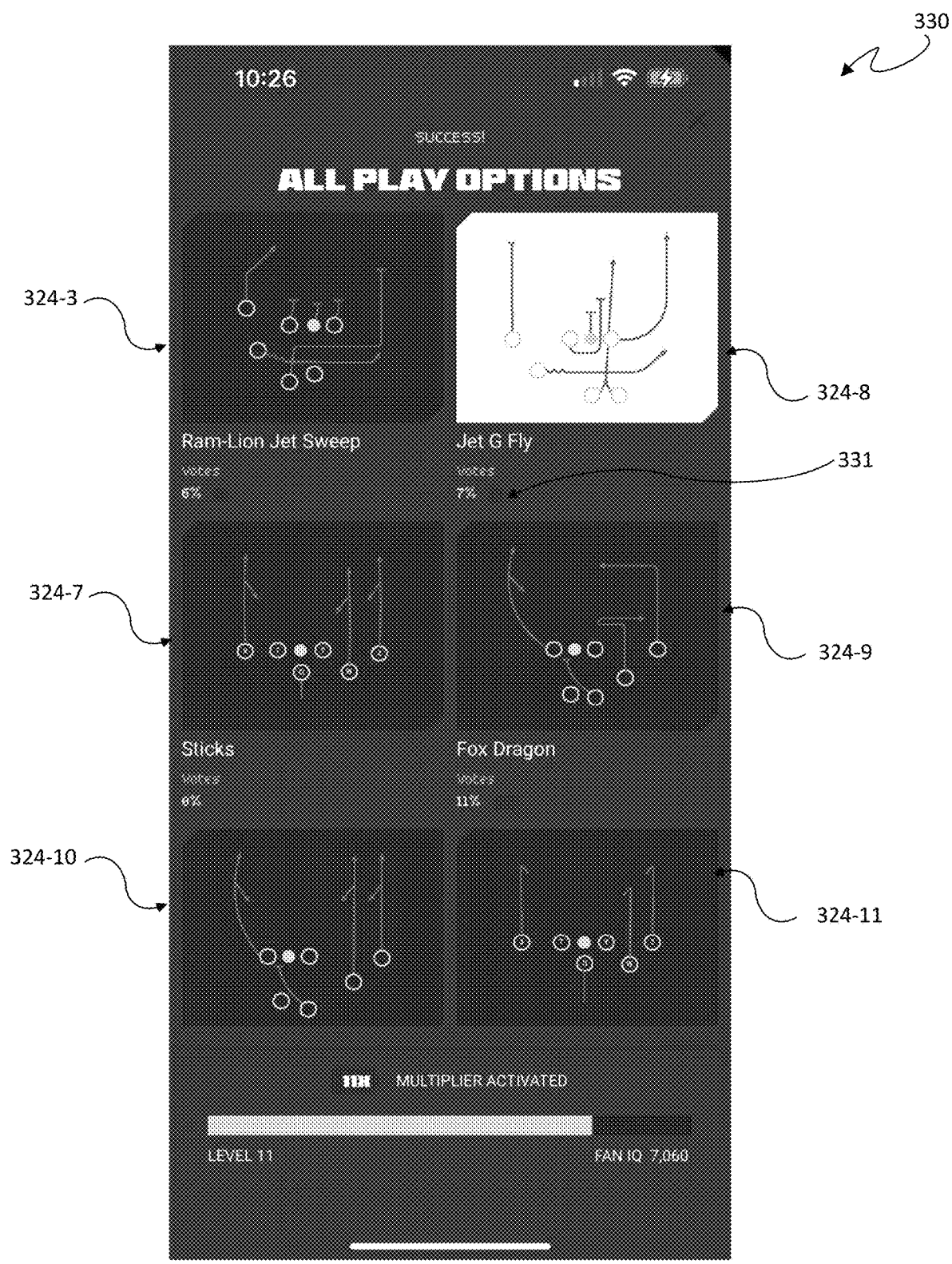
Figure 3E:
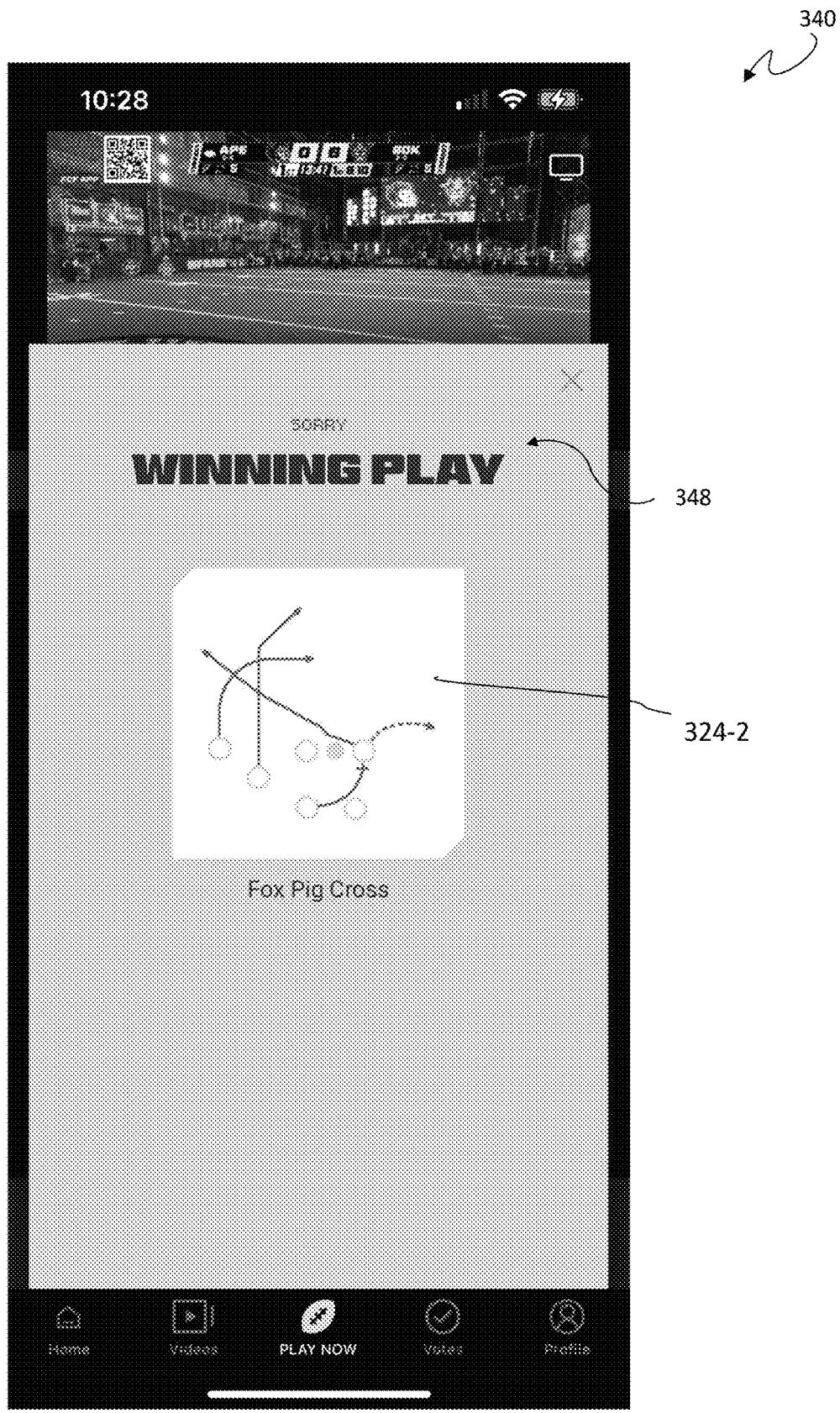
Figure 3F:
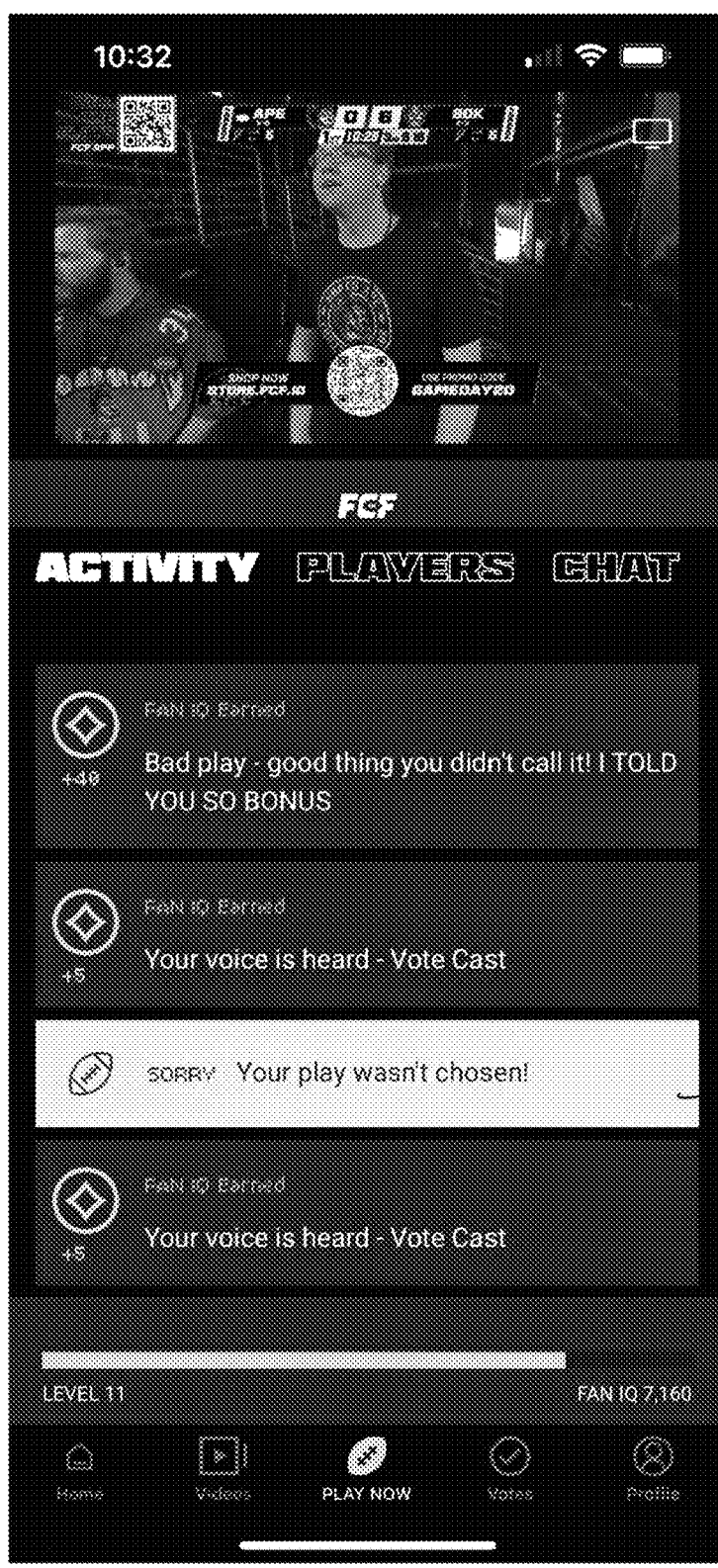

FIG. 3D illustrates an example screenshot of a user interface 330 for providing a user play call decision input which indicates that the user 172 has selected a specific play 324, i.e., play 324-8 ("Jet G Fly") and that the play selected by the user has accumulated 7% of the total play call votes, which also accounts for vote multipliers as detailed above. FIGS. 3E and 3F illustrate example screenshots of user interfaces 340 and 346 for respectively indicating to the user 172 that play 324-2 ("Fox Pig Cross") was selected as the next play to be executed and that the play selected by the user 172 was not selected. See message 348 in FIG. 3E ("SORRY WINNING PLAY") and message 350 in FIG. 3F ("SORRY Your play wasn't chosen!").

Exemplary System Hardware

Figure 4:
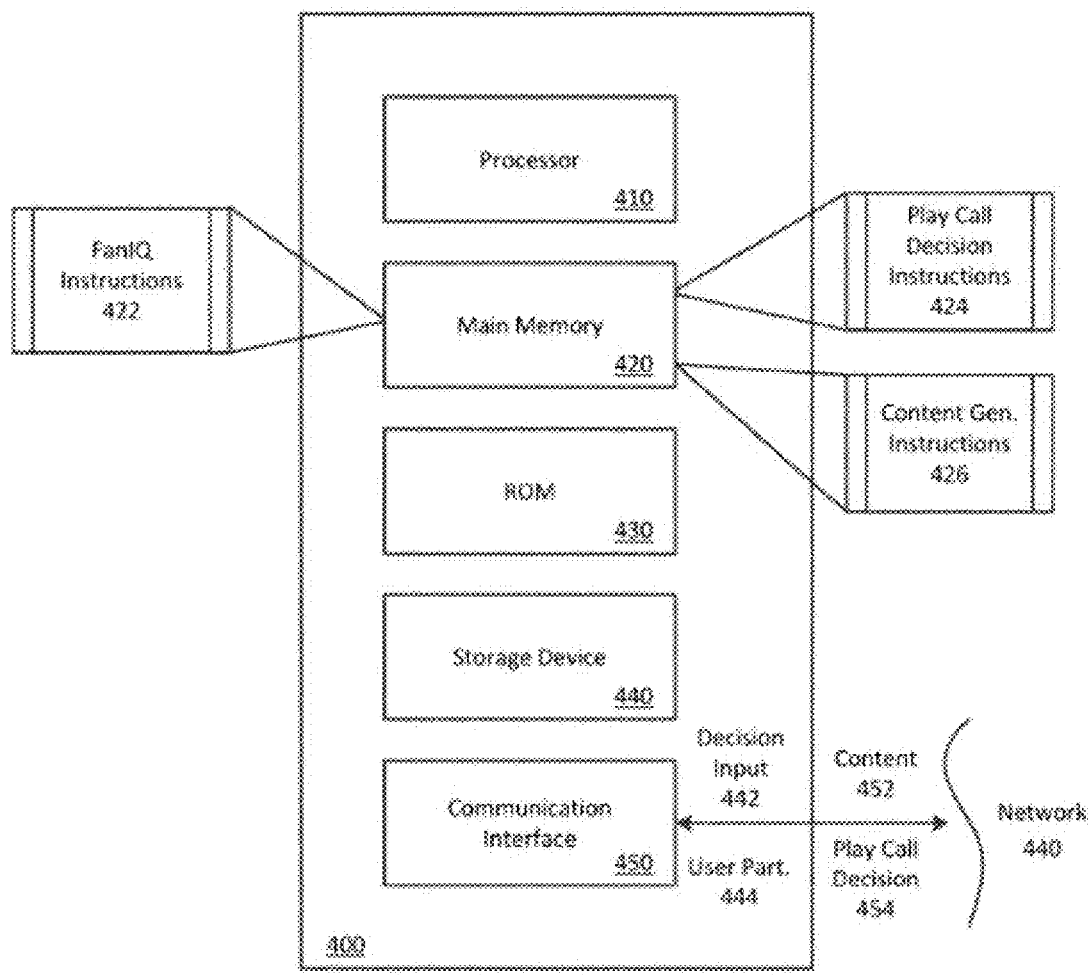
FIG. 4 is a block diagram illustrating a computer system upon which examples described herein may be implemented.

FIG. 4 is a block diagram illustrating a computer system upon which examples described herein may be implemented. A computer system 400 can be implemented on, for example, a server or combination of servers. For example, the computer system 400 may be implemented as part of a network service. In the context of FIG. 1, the interactive sports management system 100 may be implemented using a computer system 400 such as described by FIG. 4. The interactive sports management system 100 may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk, solid state storage device (e.g., SSD), or optical disk, is provided for storing information and instructions.

The communication interface 450 enables the computer system 400 to communicate with one or more networks 480 (e.g., Ethernet, cellular network) through use of the network link (wireless or wired). Using the network link, the computer system 400 can communicate with one or more computing devices and/or one or more servers. In accordance with examples, the computer system receives decision input 442 from users. The executable instructions stored in the memory 430 can include play call decision instructions 424 to generate, for example, the live play call decisions based on decision input 442. In doing so, the computer system can receive decision input 442 from each of a plurality of users associated with a particular sports team, and the processor 410 can execute the play call decision instructions 424 to generate the live play call decisions 454.

The executable instructions stored in the memory 420 can also include Fan IQ instructions, which enable the computer system 400 to determine Fan IQ scores of each of the plurality of users associated with the team. In addition, the memory 420 can also include content generation instructions 426, which enable the computer system 400 to generate content for display on user devices 170.

By way of example, the instructions and data stored in the memory 420 can be executed by the processor 410 to implement an example interactive sports management system 100 of FIG. 1. The processor 410 is configured with software and/or other logic to perform one or more processes, steps and other functions described with implementations, such as described by FIGS. 1-3B, and elsewhere in the present application.

Player Tokens

Figure 5:
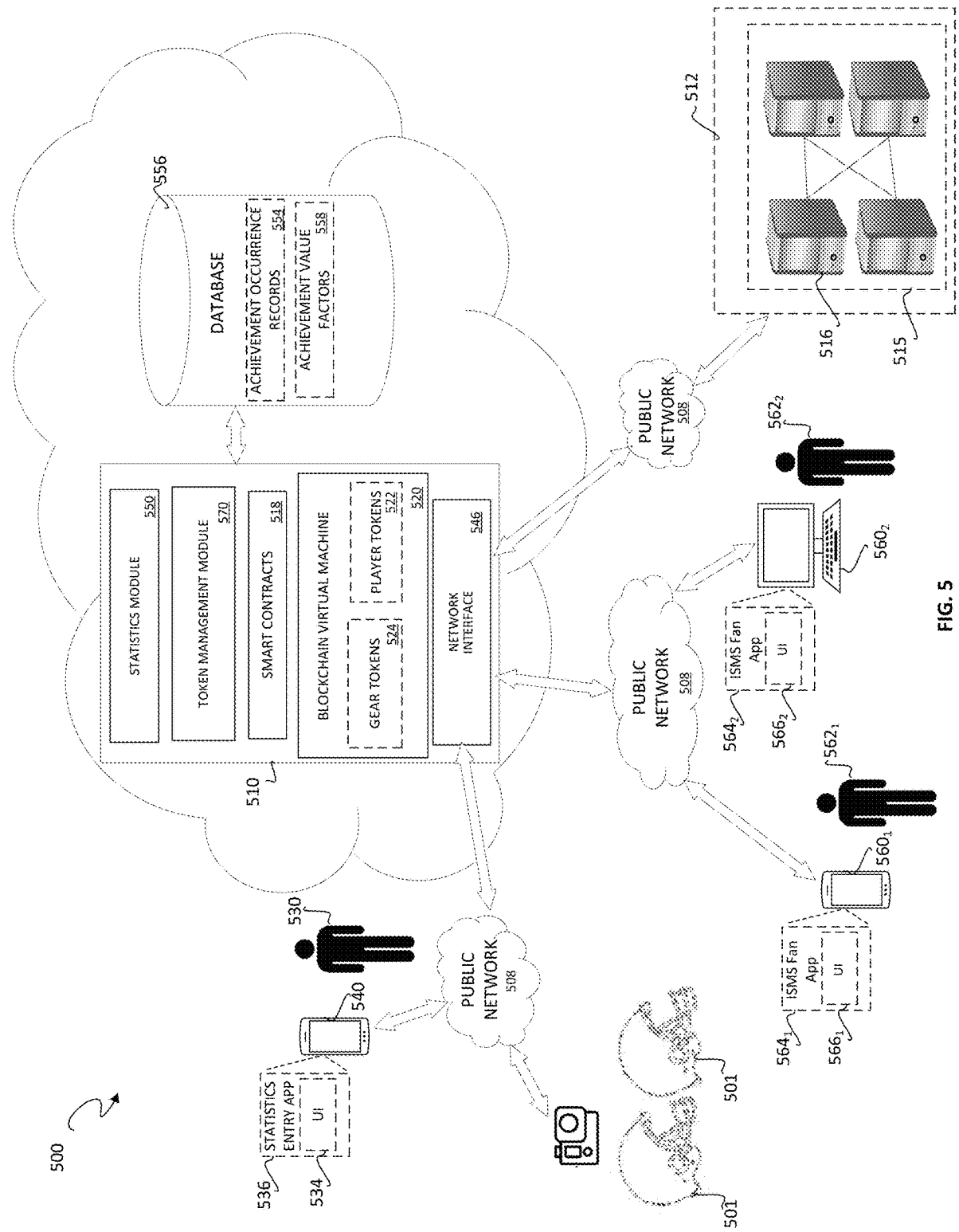
FIG. 5 illustrates a system for managing Tokens in accordance with an embodiment.

Attention is now directed to FIG. 5, which illustrates a system 500 for managing Tokens in accordance with an embodiment. The system 500 may be implemented to provide complementary functionality to the interactive sports management system 100 or, alternatively, may integrated within the system 100. As shown, the system 500 includes a token management server resource 510 configured to manage the creation (or, equivalently, "minting"), destruction (or, equivalently, "burning"), and distribution of Tokens instantiated on a distributed blockchain processing networkprocessing network 512. As shown, the blockchain processing networkprocessing network 512 includes blockchain system hardware 515 having a plurality of distributed nodes 516. Information concerning Tokens may be stored in the blockchain processing networkprocessing network 512 in accordance with one or more smart contracts 518, which implement the Tokens. The smart contracts 518 are maintained on the server resource 510 in a high-level language and which are stored as bytecode on the blockchain system hardware 515. A blockchain virtual machine 520 executes the bytecode corresponding to the smart contracts 518. As is discussed below, the Tokens, which may include Player Tokens 522 and Gear Tokens 524, are associated with players 501 and may be incremented and decremented in value based upon the achievements and performance of the players 501 during games.

In one embodiment the server resource 510 is implemented as a cloud-based server resource. As is known, cloud computing may be characterized as a model for facilitating on-demand network access to a shared pool of configurable computing resources (e.g., networks, servers, storage, applications, nodes and services) that can be rapidly provisioned and released with minimal management effort or service provider interaction. Cloud systems tend to automatically control resource use by utilizing some form of metering capability with respect to, for example, storage, processing, bandwidth, and active user accounts. Various cloud service models are possible, including cloud software as a service (SaaS), cloud platform as a service (PaaS), cloud infrastructure as a service (IaaS) and user or networked participant deployed decentralized nodes, compromising a decentralized network running the software In one embodiment the server resource 510 operates using Amazon® Web Services cloud computing services. Of course, in other embodiments some or all of the server resource 510 may be implemented using other cloud environments such as, for example, a Microsoft® Azure cloud or another third party cloud, an on premise data center or a colocation data center such as, for example, Equinix or Rackspace Technology. In other embodiments the server resource 510 may be implemented by using on premise servers and other infrastructure rather than by using cloud-based services. Alternatively, hybrid implementations of the server resource 510 including a combination of on premise and cloud-based resources are possible, including the provision of the system using a decentralized network of independent nodes.

During operation of the system 500, a statistician 530 or other individual observing games played by the players 501 enters, into a user interface 534 of a statistics entry application 536 executing on a mobile device 540, results and achievements obtained by, or otherwise associated with, the participating players 501. These results and achievements are communicated, via a network 508, by the mobile device 540 to a network interface 546 of the server resource 510 and provided to a statistics module 550. The statistics module 550 may store these results and achievements as achievement occurrence records 554 in a system database 556 and causes the values of instances of Player Tokens 522 to be accordingly updated in the manner described hereinafter.

The server resource 510 is also in communication with the mobile devices 560 of fans 562. Each mobile device 560 includes an interactive sports management system (ISMS) fan application 564 having a user interface 566. In one embodiment fans 562 can also interact with the Player Tokens 522 and the Gear Tokens 524 via a token management module 570 in the manner discussed below.

Figure 6A:
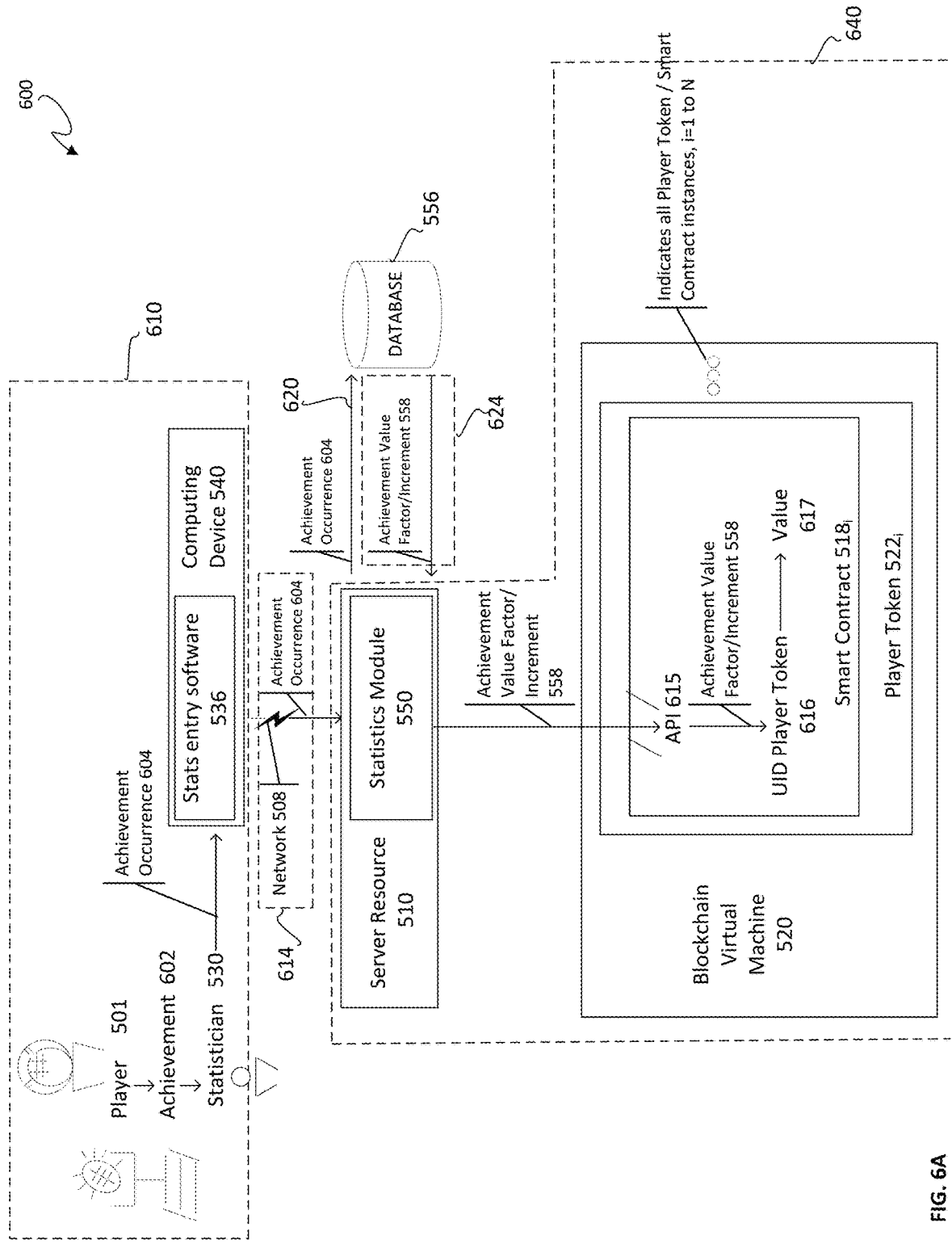
FIGS. 6A and 6B are data flow diagrams representative of earned rewards mechanics pursuant to which a Player Token may be incremented in value in accordance with achievements or other positive performance rendered by a player associated with the Player Token.

Turning now to FIG. 6A, there is shown a data flow diagram representative of an earned rewards mechanic 600 pursuant to which an instance of a Player Token $522_i$ may be incremented in value in accordance with achievements or other positive performance rendered by a player 501 associated with the Player Token $522_i$. Pursuant to the method 600, when a player 501 executes a notable achievement 602 during a game (e.g., is responsible for a touchdown or interception in a football game; or is responsible for a homerun or a strikeout in a baseball game) the statistician 530 enters an achievement occurrence 604 corresponding to the achievement 602 into the statistics entry application 536 executing on the mobile device 540 or other computing device (stage 610). The statistics entry application 536 causes the mobile device 540 to communicate the achievement occurrence 604 to the statistics module 550 (stage 614). The statistics module 550 records the achievement occurrence 604 in the system database 556 as an achievement occurrence record 554 (stage 620). The statistics module 550 retrieves an achievement value factor/increment 558 corresponding to the achievement occurrence 604 from the system database 556 (stage 624). The statistics module 550 then contacts the instance of the Player Token $522_i$ in the blockchain virtual machine 520 associated with the achievement value factor/increment 558 in order to update its value in accordance with such achievement value factor/increment 558 (stage 640). Specifically, the statistics module 550 may interface, over the network 508, with an API 615 in the instantiated bytecode for the smart contract $518_i$ corresponding to the Player Token $522_i$ and pass the achievement value factor/increment 558. The smart contract $518_i$ instantiated in the processing network 512 applies the achievement value factor/increment 558, which thereby increases a value 617 of the Player Token $522_i$ by updating the unique ID (UID) of the Player Token (which is comprised of the Contract Address and Token ID) 616 of the Player Token $522_i$.

Figure 6B:
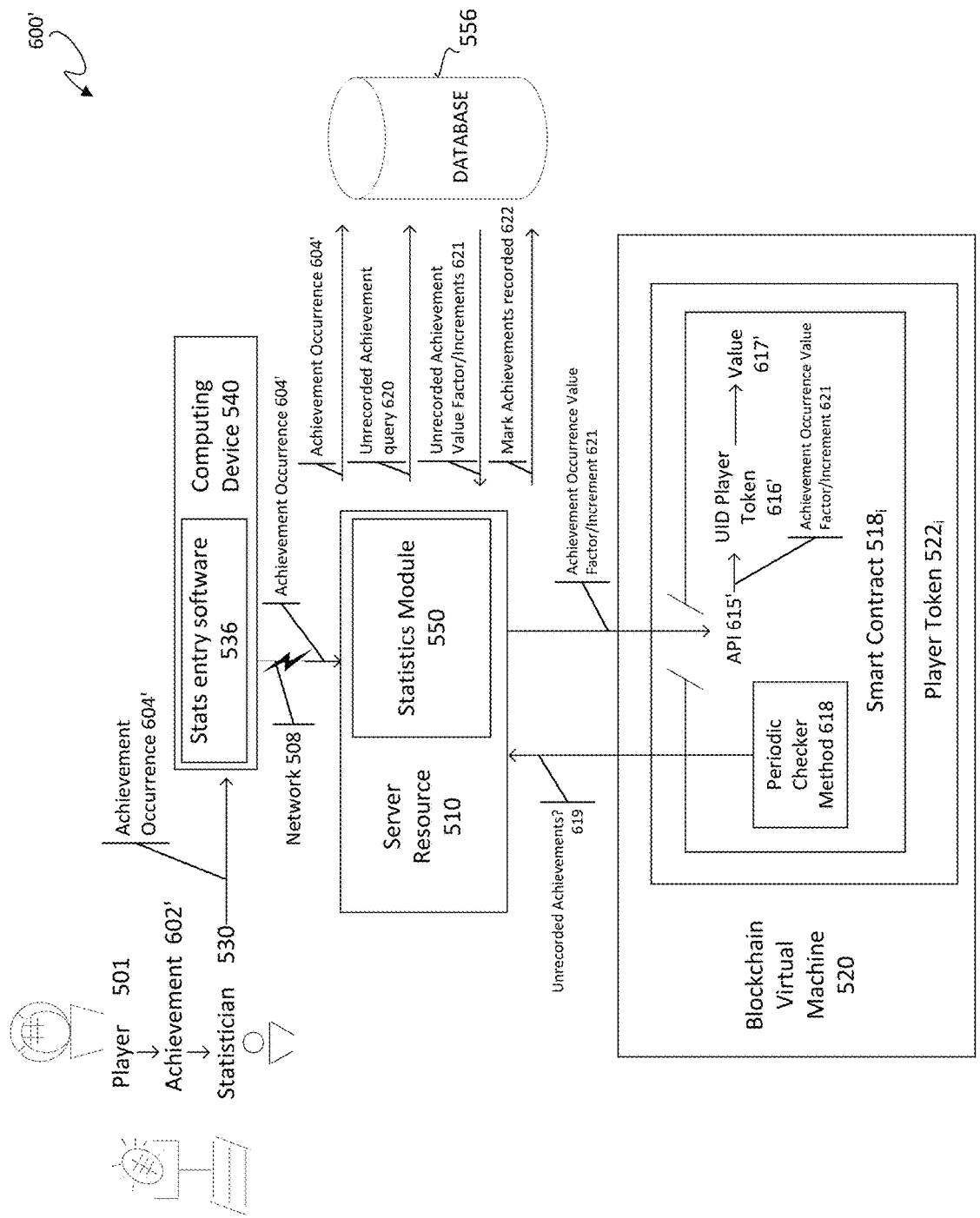

FIG. 6B illustrates a data flow diagram of another embodiment of an earned rewards mechanic 600 pursuant to which a Player Token $522_i$ may be incremented in value. Pursuant to the method 600', when a player 501 executes a notable achievement 602 during a game the statistician 530 enters an achievement occurrence 604' corresponding to the achievement 602' into the statistics entry application 536 executing on the mobile device 540 or other computing device. The statistics entry application 536 causes the mobile device 540 to communicate the achievement occurrence 604' to the statistics module 550. The statistics module 550 records the achievement occurrence 604' in the system database 556 as an achievement occurrence record 554. A method 618 in the Player Token $522_i$ smart contract 518; in the blockchain virtual machine 520 periodically contacts the statistics module 550 over the network 508 to determine if there have been any unrecorded achievements 619. The statistics module 550 queries the database 556 for any unrecorded achievements 620 for the Player Token $522_i$. If any unrecorded achievements value factor/increments 621 are returned from the database 556, the statistics module 550 marks those unrecorded achievements recorded 622 and communicates the unrecorded achievements achievement value factor/increments 621 sequentially to the Player Token $522_i$ in the blockchain virtual machine 520 over the network 508 via an API 615' in the Player Token $522_i$ smart contract 518i. The Player Token $522_i$ applies the achievement value factor/increment 621 which thereby increases its value 617' accordingly by updating the UID of the Player Token 616'. In other embodiments the earned reward mechanics of FIGS. 6A and 6B may be triggered by a notable achievement outside of a game.

Gear Tokens/Interlocking Tokens

Another example of an NFT offered by the interactive sports management system is a Gear Token 524. Gear Tokens 524 may correspond to physical items or equipment in the game. Examples would be gloves for a receiver or cleats for a running back in football; or the bat for a batter or the resin bag for a pitcher in baseball. Gear Tokens 524 have may different rarities, attributes, efficacies and values. For example, a Glove Gear Token 524 could come in silver (most common), gold (moderately rare) and platinum (very rare) versions. As with other NFTs, the rarer the Token, the more valuable it is. In addition, a rarer NFT, which may have multiple attributes (e.g., the ability to interlock with more than one other NFT as described below), may have more efficacy in its ability increase a Fan's Coaching Power (defined by the number of play call determination votes), rewards, Fan IQ accumulation, etc. Gear Tokens 524 will be minted at times determined by the league and may be awarded to Fans and/or available for purchase.

Gear Tokens 524 interact with Player Tokens 522. In the football example, the Glove Gear Token 524 can interact with a receiver Player Token 522 and the Cleats Gear Token 524 can interact with the running back Player Token 522. In the baseball example, the Bat Gear Token 524 can interact with a Batter Player Token 522 and the Resin Bag Gear Token 524 can interact with a pitcher Player Token 522.

Gear Tokens 524 may have hidden/discoverable abilities and efficacies which are not revealed/apparent to the Fan until the Fan connects the Gear Token 524 with another Gear Token 524 or Player Token. The act of connecting the two Tokens reveals the hidden abilities/efficacies.

If a fan possesses two Tokens which can interact with each other, that fan can select to "connect" (or interlock) said Tokens and at some future time, select to "disconnect' the Tokens. These connection/disconnection actions are infinitely repeatable as long as the fan still possesses the appropriate Tokens. In order to sell or burn a Token which is interlocked with another Token, the fan must first select to disconnect the interlocked Tokens. Once a Gear Token 524 is interlocked with a Player Token, the efficacy of the Player Token in the physical game is thereby increased by a measure determined by the rarity of the Gear Token 524.

Figure 7:
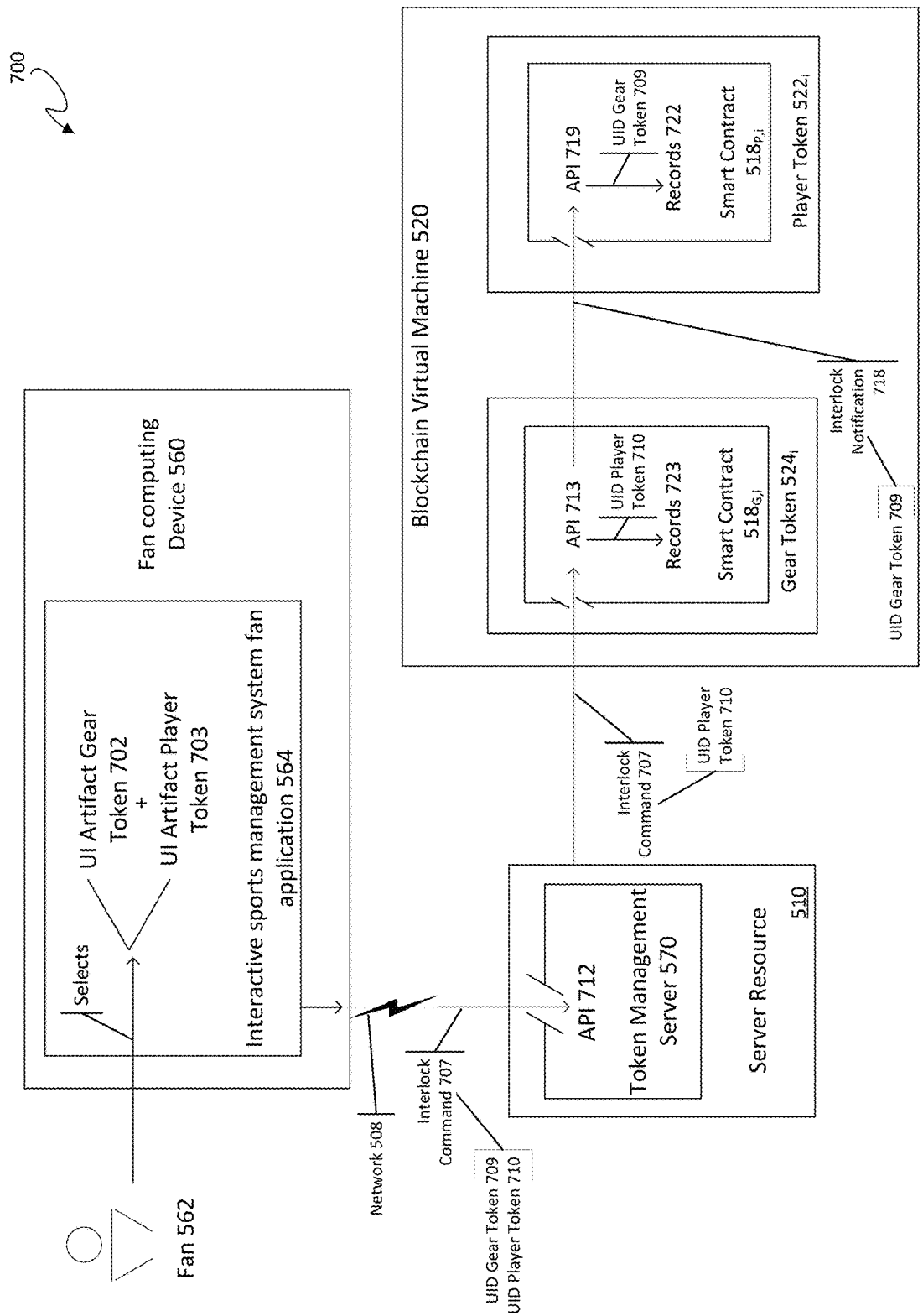

FIGS. 7-9 are data flow diagrams illustrating exemplary mechanics for Token interlocking and disconnection and for increasing Token efficacy, in accordance with an embodiment. Attention is initially directed to FIG. 7, which is a data flow diagram illustrating an embodiment of a mechanic 700 for interlocking Tokens. As shown, a fan 562 selects a UI artifact 702 of a Gear Token $524_i$ and a UI artifact 703 of the Player Token $522_i$ that he/she owns to be interlocked in the interactive sports management system fan application 564 executing on a fan computing device 560. The interactive sports management system fan application 564 sends an interlock command 707 containing the unique ID (UID) 709 of the Gear Token $524_i$ and the UID 710 of the Player Token $522_i$ to be interlocked over the network 508 to an API 712 on the token management server 570 on the server resource 510.

The token management server 570 calls, over the network 508, an API 713 on the smart contract $518_{G,i}$ of the Gear Token $524_i$ specified by its UID 709 in the Blockchain Virtual Machine 520. Through this API call the token management server 570 passes an interlock command 707 including the UID 710 of the Player Token $522_i$ to which the Gear Token $524_i$ is to interlock. The Gear Token 524 records 723 the UID Player Token 710 of the Player Token 522 with which the Gear Token $524_i$ is also being interlocked. The smart contract $518_{G,i}$ calls an API 719 on the smart contract $518_{P,i}$ of the specified Player Token $522_i$ via the Blockchain Virtual Machine 520 in order to send an interlock notification 718. The interlock notification 718 passes the UID Gear Token 709 to the smart contract $518_{P,i}$ of the specified Player Token $522_i$, thus notifying the specified Player Token $522_i$ that it has been interlocked with the Gear Token $524_i$ associated with the UID Gear Token 709. The smart contract $518_{P,i}$ then records 722 the UID Gear Token 709 of the interlocked Gear Token $524_i$. Both the Gear Token Gear Token $524_i$ and the Player Token $522_i$ to be interlocked may optionally check to see if they have already been interlocked before proceeding with the interlocking operation. In one embodiment once the Gear Token $524_i$ and Player Token $522_i$ are interlocked they can no longer be interlocked with other Tokens, or be sold or burned without first being disconnected.

Figure 8A:
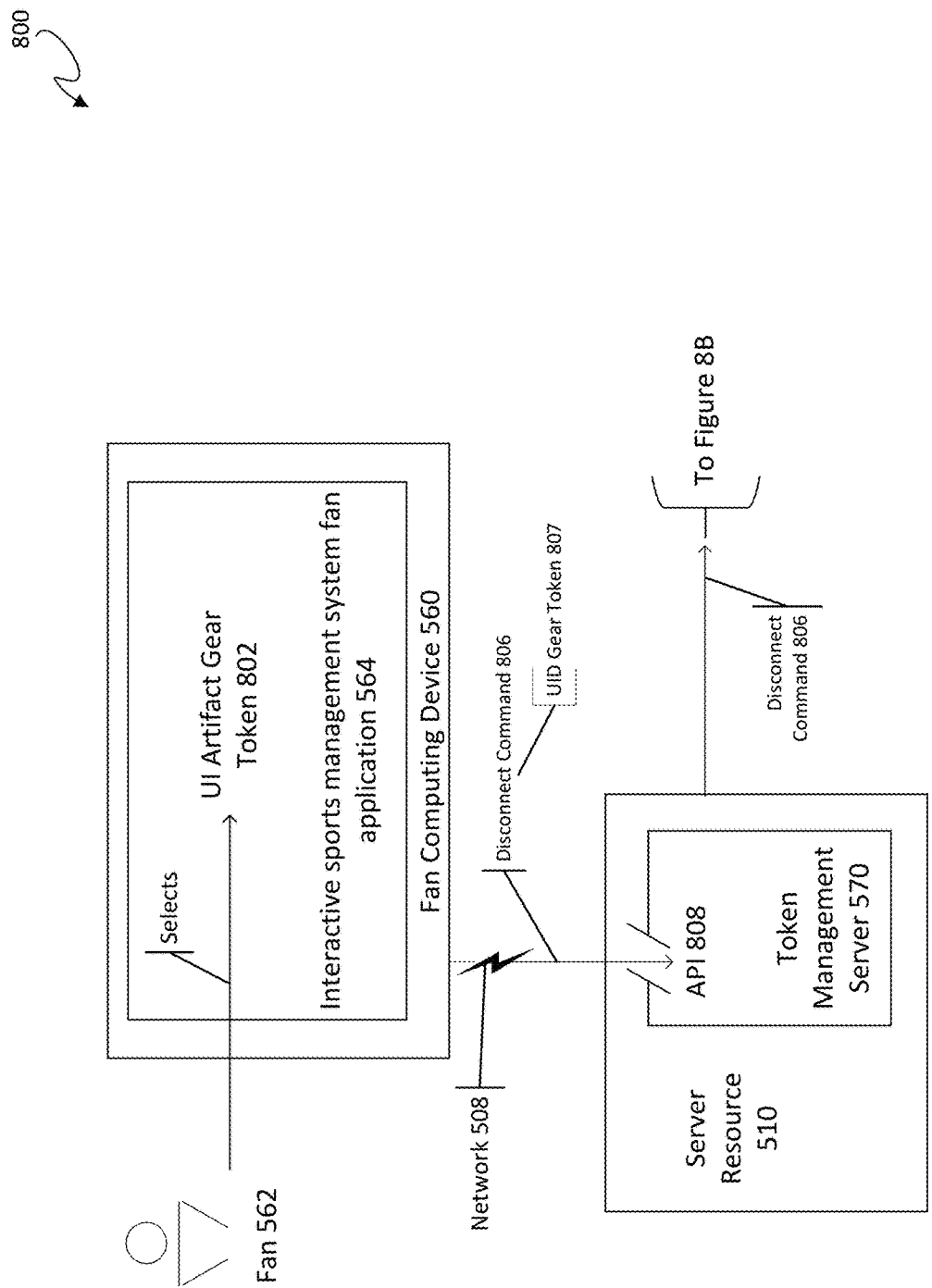
FIGS. 8A-8C are a flow diagram representative of an exemplary process for disconnecting interlocked Tokens.
Figure 8B:
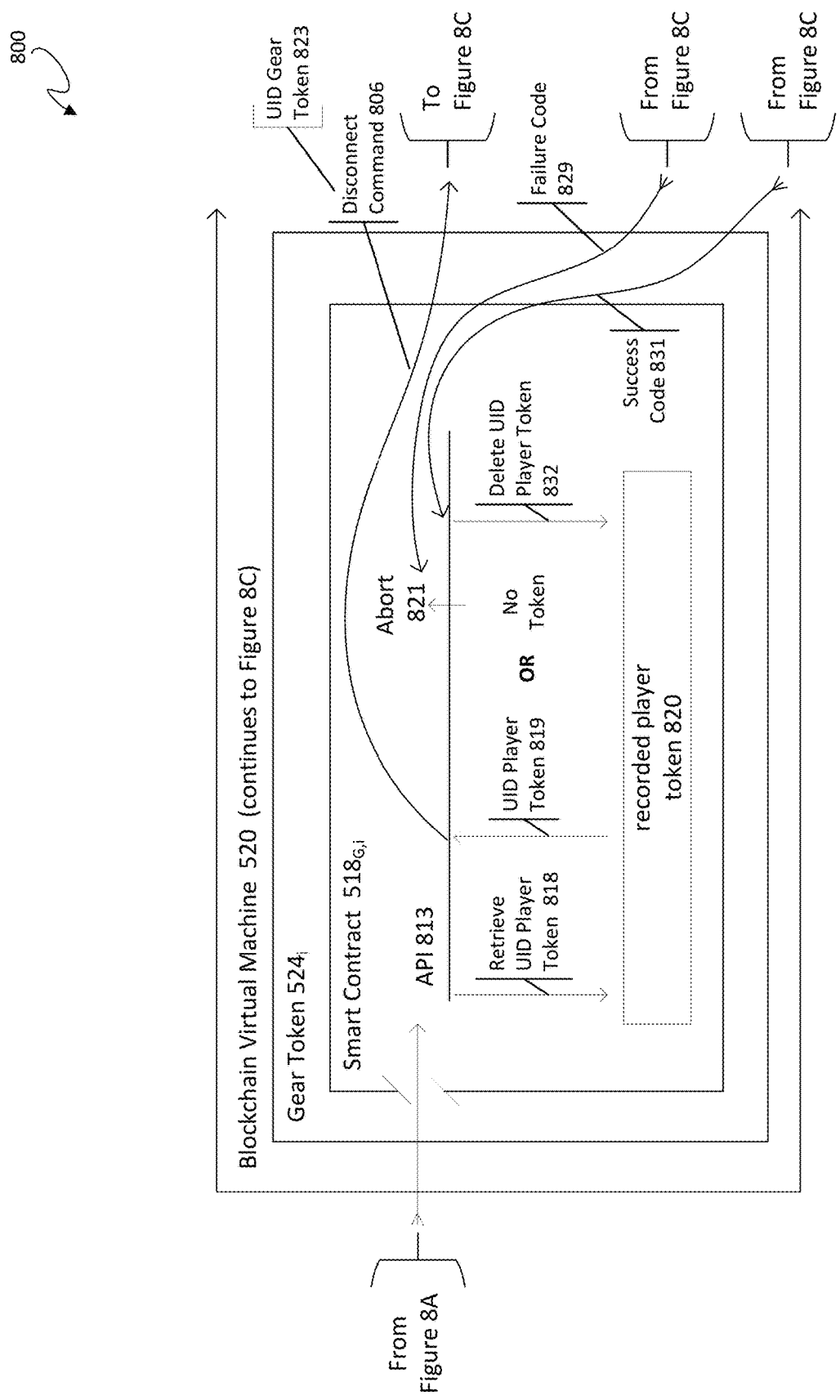
Figure 8C:
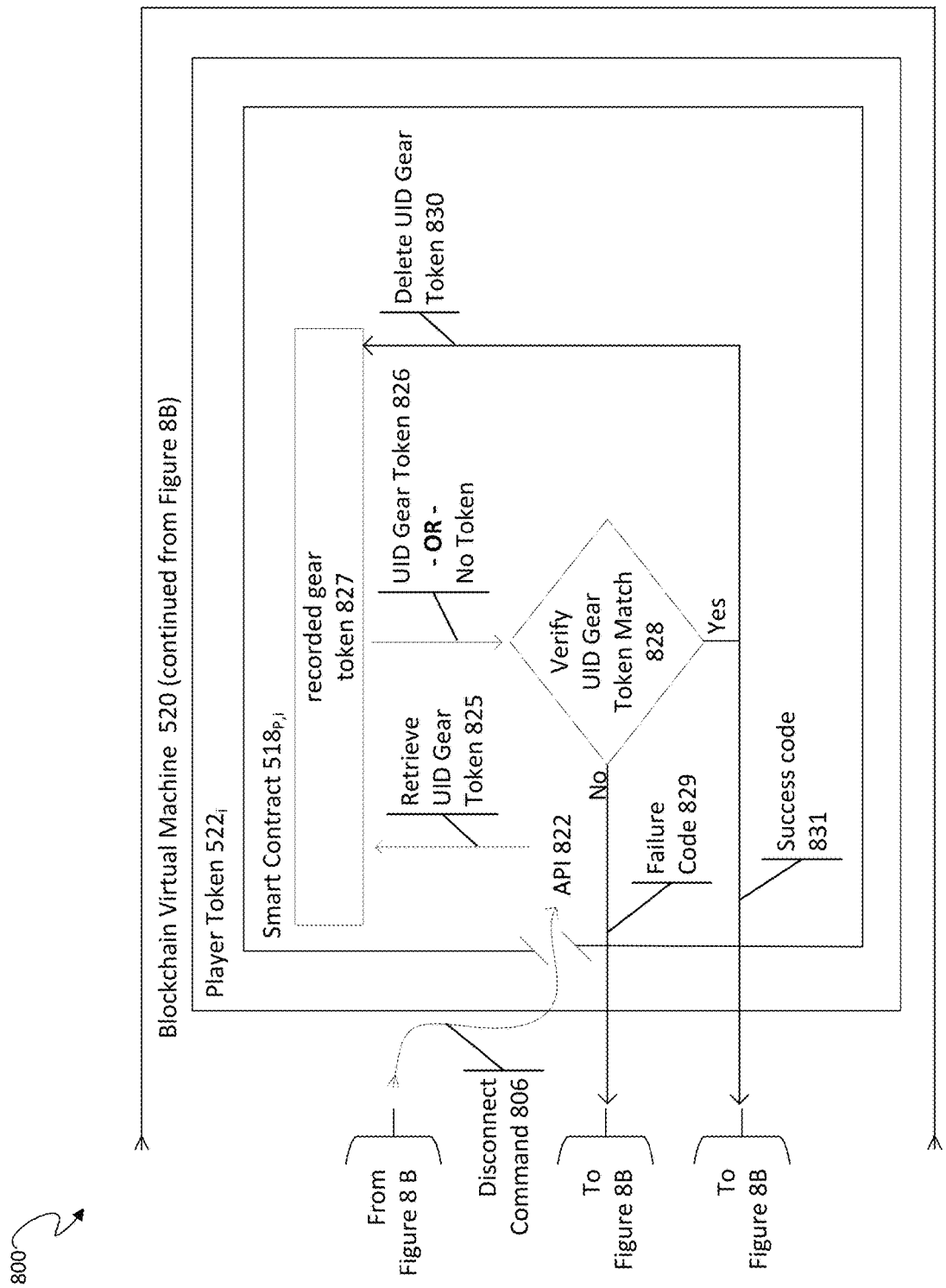

Turning now to FIGS. 8A-8C, a flow diagram is provided for an exemplary process 800 for disconnecting interlocked Tokens. As shown in FIG. 8A, a fan 562 may select, from the UI 566 of the interactive sports management system fan application 564 executing on a computing device 560, the UI artifact 702 of the Gear Token $524_i$ that is interlocked with a Player Token $522_i$ owned by the fan 562. The interactive sports management system fan application 564 sends, to an API 808 on the token management server 570, a disconnect command 806 containing the unique ID (UID) 807 of the Gear Token $524_i$ to be disconnected from the interlocked Player Token $522_i$.

As shown in FIG. 8B, the Token Management Server 570 calls an API 813 on the smart contract $518_{G,i}$ of the Gear Token $524_i$ specified by its UID 807 in the Blockchain Virtual Machine 520. Through this API call the token management server 570 passes a disconnect command 806 including the UID 816 of the Player Token $522_i$ from which the interlocked Gear Token $524_i$ is being commanded to disconnect. The smart contract $518_{G,i}$ retrieves 818 the UID 819 of the Player Token $522_i$ that is currently interlocked from a recorded Player Token 820. If no UID Player Token 819 is retrieved, then the process is aborted 821.

Referring to FIG. 8C, if a UID Player Token 819 is retrieved then the Gear Token $524_i$ calls an API 822 on the smart contract $518_{P,i}$ of the specified, interlocked Player Token $522_i$. Through this API call a disconnect command 824 including the UID Gear Token 823 is passed. The disconnect command 824 commands the interlocked Player Token $522_i$ to disconnect from the Gear Token 524. The smart contract $518_{P,i}$ retrieves 825 the UID 826 of the Gear Token $524_i$ to which it is currently interlocked from the recorded Gear Token 827 to and verifies that the retrieved UID Gear Token 826 matches the UID Gear Token 823 passed to the API 822 by the smart contract $518_{G,i}$.

If no UID Gear Token 826 is retrieved or if the retrieved UID 826 Gear Token and the UID Gear Token 823 passed to the API 822 by the smart contract $518_{G,i}$ do not match, a failure code 829 is returned to the smart contract $518_{G,i}$. Otherwise, the smart contract $518_{P,i}$ deletes 830 the UID 826 of the interlocked Gear Token $524_i$ from the recorded gear token 827 and returns a success code 831 to the smart contract $518_{G,i}$. Next, the smart contract $518_{G,i}$ deletes 832 the UID 819 of the interlocked Player Token $522_i$ from the recorded player token 820. The previously interlocked Gear Token $524_i$ and the previously interlocked Player Token $522_i$ are now disconnected and can be interlocked with other Tokens at this time, sold or burned.

In another embodiment the interactive sports management system fan application 564 executing on a computing device 560 retrieves and stores the UID of any Player Token $522_i$ owned by the associated fan 562. Accordingly, when a fan 562 selects, from the UI 566 of the interactive sports management system fan application 564, the UI artifact 802 of a Gear Token $524_i$ interlocked with such a Player Token $522_i$, the UID of the Player Token $522_i$ is passed to an API 808 on the Token Management Server 550 along with the UID Gear Token 807 included with the Disconnect Command 806.

The Token Management Server 570 then calls an API 813 on the smart contract $518_{G,i}$ of the Gear Token $524_i$ specified by its UID 807 in the Blockchain Virtual Machine passing the UID of the interlocked Player Token $522_i$ with the Disconnect Command 806. The smart contract $518_{G,i}$ retrieves 818 the UID 819 of the Player Token $522_i$ that is currently interlocked from a recorded Player Token 820 and compares that UID against the retrieved UID 819 of the Player Token $522_i$. If no UID Player Token 819 is retrieved or if the retrieved UID 819 of the Player Token $522_i$ does not match the UID of the interlocked Player Token $522_i$ passed with the Disconnect Command 806, then the process is aborted 821. Otherwise, the process then continues as described above with reference to FIG. 8C.

Figure 9A:
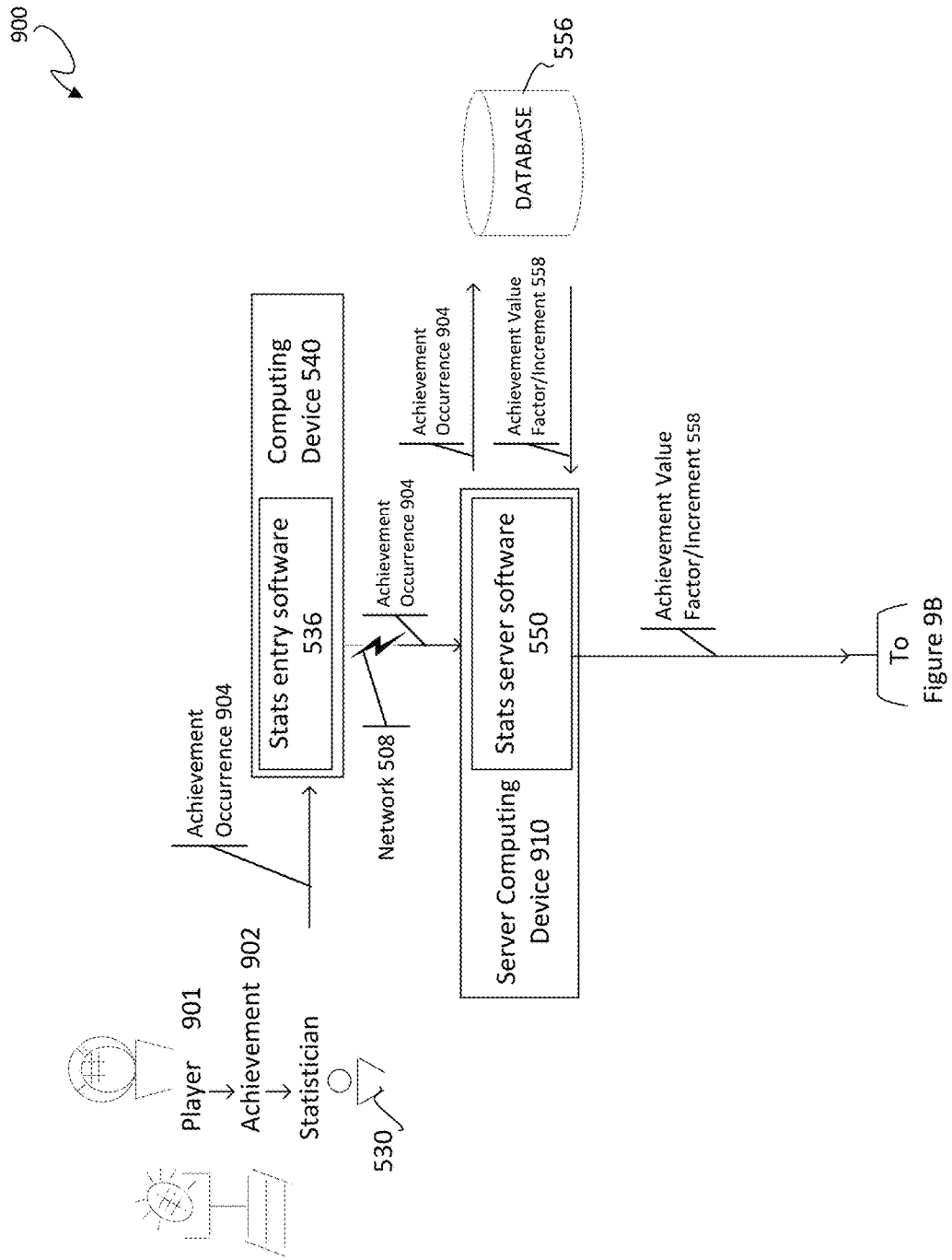
FIGS. 9A-9B are a flow diagram representative of an exemplary process through which Token interlocking may increase the efficacy with which achievement occurrences enhance Token value.
Figure 9B:
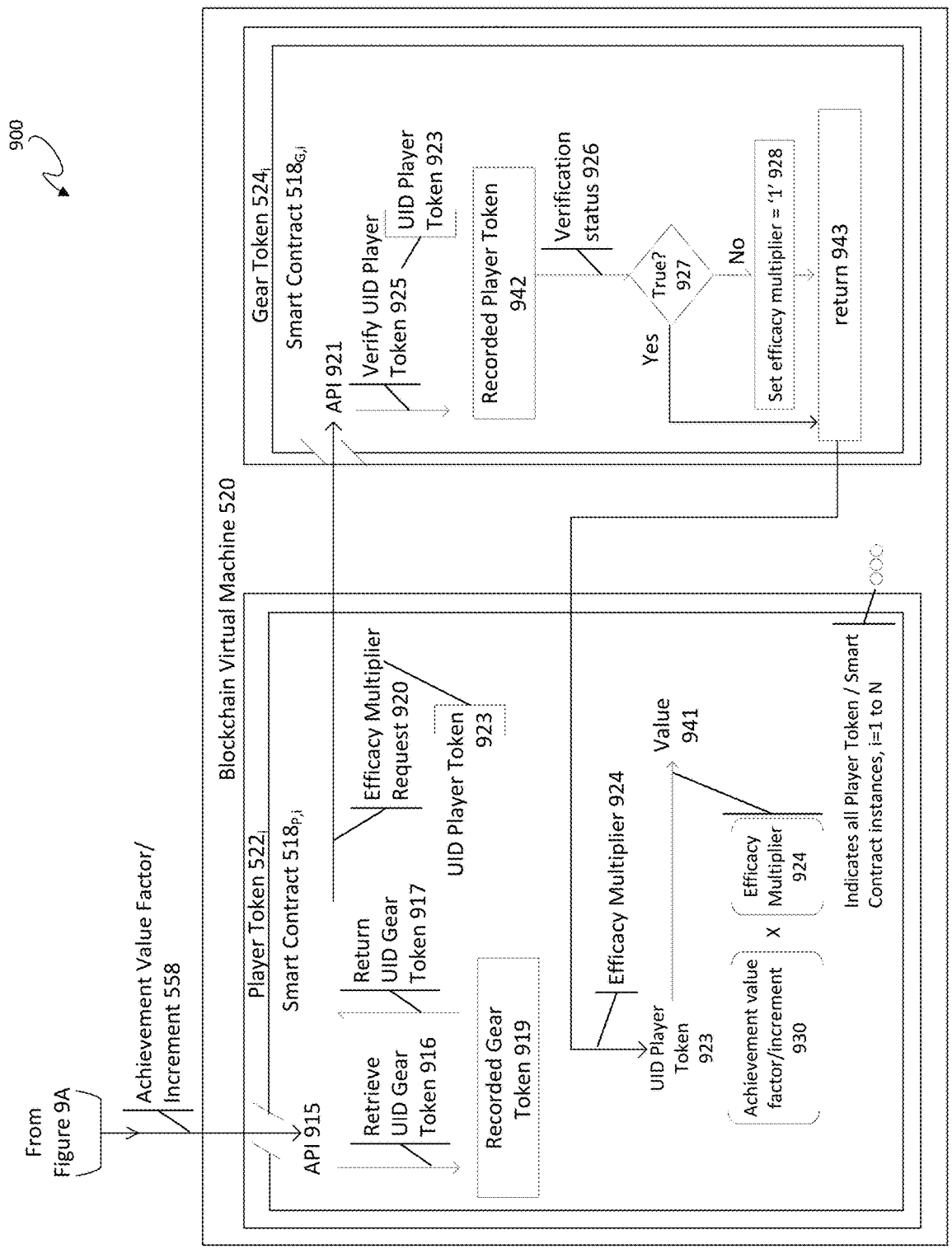

Referring now to FIGS. 9A-9B, a flow diagram is provided for an exemplary process 900 through which Token interlocking may increase the efficacy with which achievement occurrences enhance Token value. As shown in FIG. 9A, when a player 501 executes a notable achievement 902 during a game the statistician 530 enters an achievement occurrence 904 corresponding to the achievement 902 into the statistics entry application 536 executing on the mobile device 540 or other computing device. The statistics entry application 536 causes the mobile device 540 to communicate the achievement occurrence 904 to the statistics module 550. The statistics module 550 records the achievement occurrence 904 in the system database 556 as an achievement occurrence record 554. The statistics module 550 retrieves an achievement value factor/increment 558 corresponding to the achievement occurrence 904 from the system database 556. The statistics module 550 then contacts the instance of the Player Token 522 in the blockchain virtual machine 520 associated with the achievement value factor/increment 558 in order to update its value in accordance with such achievement value factor/increment 558.

Referring to FIG. 9B, the Player Token $522_i$ attempts to retrieve 916 a UID 917 for a valid Gear Token 918 in the recorded gear token 919. If a UID Gear Token 917 is returned, it then makes an efficacy multiplier request 920 by calling an API 921 on the smart contract 518$_{G,i}$ for the Gear Token 524$_i$ and passing the UID 923 of the Player Token 912 via the Blockchain Virtual Machine 520 to obtain efficacy multiplier 924 of the Gear Token 524$_i$. If there is no interlocked Gear Token 524$_i$, then the efficacy multiplier 924 is set to '1'.

The smart contract 518$_{G,i}$ verifies 925 the UID 923 of the Player Token 522$_i$ using the Recorded Player Token 942. If the verification status 926 of the UID 923 of the Player Token 522$_i$ is "true" 927, the smart contract 518$_{G,i}$ returns 943 the efficacy multiplier 924 to smart contract 518$_{P,i}$ for the Player Token 522$_i$. Otherwise the smart contract 918$_{G,i}$ sets the value of the efficacy multiplier 924 to '1' 928 and returns 926 the efficacy multiplier 924 to the smart contract 518$_{P,i}$.

The smart contract 518$_{P,i}$ applies the achievement value factor/increment 930 multiplied by the efficacy multiplier 924 returned from the smart contract 518$_{G,i}$, which thereby increases the Player Token's 522$_i$ value 941 by accessing it using the UID Player Token 923.

In another embodiment, the Player Token periodically contacts the statistics server module 550 to determine if there have been any unrecorded achievements in the manner described above with reference to FIG. 6B. The Player Token 522$_i$ then retrieves and applies an efficacy multiplier from the interlocked Gear Token 524$_i$, if any, in the above-described manner.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for managing tokens used in an interactive sports management system enabling remote participation in decisions affecting activity in a sporting event in which playcall information pertaining to plays applicable to a current game situation in the sporting event is transmitted to fan computing devices operated by fans and votes for plays are received from each of the fan computing devices, the interactive sports management system determining a selected play based on the received votes and transmitting the selected play to one or more participant computing devices associated with at least one of players and coaches involved in the sporting event wherein the players execute the selected play during the sporting event, the method comprising:

recording, within a blockchain processing network, player tokens corresponding to the players wherein the player tokens are respectively implemented by player smart contracts instantiated within the blockchain processing network and executed by a blockchain virtual machine;

receiving, by a statistics module, results information relating to performances of the players participating in the sporting event;

storing, within a database, the results information wherein the results information includes a first achievement occurrence associated with a first player of the players, the first player being associated with a first player token of the player tokens implemented by a first player smart contract of the player smart contracts wherein the first player token is associated with a first gear token corresponding to equipment used by the first player in the sporting event;

providing, to the first player smart contract, a first value factor corresponding to the first achievement occurrence wherein the first player smart contract updates a value of the first player token within the blockchain processing network based upon the first value factor.

2. The method of claim 1, further including:

receiving a request to determine if the results information stored within the database includes any unrecorded achievement occurrences for which value factors have not been recorded in the blockchain processing network wherein the request is generated by a second player smart contract of the player smart contracts;

querying the database and identifying at least one unrecorded achievement occurrence;

providing, to the second player smart contract, a second value factor corresponding to the at least one unrecorded achievement occurrence wherein the second player smart contract updates a value of a second player token within the blockchain processing network based upon the second value factor.

3. The method of claim 1 wherein the receiving includes receiving the results information from a mobile device located at a position from which the sporting event may be observed.

4. The method of claim 1 further including:

receiving, from a first fan computing device of the fan computing devices wherein the first fan computing device is associated with an owner of the first player token, a first interlock command specifying that the first player token is to be interlocked with the first gear token wherein the first gear token is implemented via a first gear smart contract instantiated in the blockchain processing network and executed by the blockchain virtual machine;

passing the first interlock command to the first gear token, the first interlock command including a first player identifier corresponding to the first player token wherein the first gear token records the first player identifier within the block chain processing network.

5. The method of claim 4 wherein:

the first gear smart contract sends a first interlock notification to the first player smart contract thereby notifying the first player token that the first player token has been interlocked with the first gear token;

the first player token records, within the block chain processing network, a first gear identifier corresponding to the first gear token.

6. The method of claim 5 further including:

receiving a disconnect command containing the first gear identifier;

passing, to the first gear smart contract, the disconnect command;

wherein the disconnect command further contains the first player identifier;

wherein the first gear smart contract retrieves a first recorded player identifier of the first player token and passes another disconnect command to the first player smart contract;

wherein the first player smart contract retrieves a first recorded gear identifier of the first gear token and verifies that the first recorded gear identifier matches the first gear identifier and deletes the first recorded gear identifier; and wherein the first gear smart contract deletes the first recorded player identifier.

7. The method of claim 1 wherein the providing includes passing the first value factor to an application programming interface (API) of bytecode of the first player smart contract instantiated within the blockchain processing network, the first player smart contract updating, via a unique identifier of the first player token, the first value factor.

8. The method of claim 1 wherein the results information includes a second achievement occurrence associated with a second player of the players, the second player being associated with a second player token of the player tokens and a second player smart contract of the player smart contracts, the method further including:

providing, to the second player smart contract, a second value factor corresponding to the second achievement occurrence wherein the second player smart contract retrieves, from a second gear smart contract associated with a second gear token to which the second player token is interlocked, an efficacy multiplier of the second gear token;

wherein the second player smart contract updates a value of the second player token within the blockchain processing network based upon the second value factor and the efficacy multiplier.

9. The method of claim 1 wherein the first gear token is characterized by a first rarity among a plurality of possible rarities.

10. A method for managing tokens used in an interactive sports management system enabling remote participation in decisions affecting activity in a sporting event in which fan computing devices operated by fans provide information influencing behavior of players involved in the sporting event, the interactive sports management system including a server platform in communication with a blockchain processing network in which are recorded player tokens corresponding to the players wherein the player tokens are respectively implemented by player smart contracts instantiated within the blockchain processing network and executed by a blockchain virtual machine, the method comprising:

receiving, by a statistics module of the server platform, results information relating to performances of the players participating in the sporting event;

storing, within a database accessible to the server platform, the results information wherein the results information includes a first achievement occurrence associated with a first player of the players, the first player being associated with a first player token of the player tokens implemented by a first player smart contract of the player smart contracts and wherein the results information includes a second achievement occurrence associated with a second player of the players, the second player being associated with a second player token of the player tokens and a second player smart contract of the player smart contracts;

providing, to the first player smart contract, a first value factor corresponding to the first achievement occurrence wherein the first player smart contract updates a value of the first player token within the blockchain processing network based upon the first value factor;

interlocking a gear token with the second player token wherein the gear token is associated with an efficacy multiplier; and providing, to the second player smart contract, a second value factor corresponding to the second achievement occurrence wherein the second player smart contract updates a value of the second player token within the blockchain processing network based upon the second value factor and the efficacy multiplier.

11. An electronic system for token management for use in an interactive sports management system enabling remote participation in decisions affecting activity in a sporting event in which fan computing devices operated by fans provide information influencing behavior of players involved in the sporting event, the electronic system comprising:

a database;

a server platform in communication with a block chain processing network in which are recorded player tokens corresponding to the players wherein the player tokens are respectively implemented by player smart contracts instantiated within the blockchain processing network and executed by a blockchain virtual machine, the server platform including one or more hardware processors configured by machine-readable instructions to:

receive results information relating to performances of the players participating in the sporting event;

store, within the database, the results information wherein the results information includes a first achievement occurrence associated with a first player of the players, the first player being associated with a first player token of the player tokens implemented by a first player smart contract of the player smart contracts;

provide, to the first player smart contract, a first value factor corresponding to the first achievement occurrence wherein the first player smart contract updates a value of the first player token within the blockchain processing network based upon the first value factor;

receive, from a first fan computing device of the fan computing devices wherein the first fan computing device is associated with an owner of the first player token, a first interlock command specifying that the first player token is to be interlocked with a first gear token wherein the first gear token is implemented via a first gear smart contract instantiated in the blockchain processing network and executed by the blockchain virtual machine; and pass the first interlock command to the first gear token, the first interlock command including a first player identifier corresponding to the first player token, wherein the first gear token records the first player identifier within the block chain processing network.

12. The system of claim 11, wherein:

the first gear smart contract sends a first interlock notification to the first player smart contract thereby notifying the first player token that the first player token has been interlocked with the first gear token; and the first player token records, within the block chain processing network, a first gear identifier corresponding to the first gear token.

* * * * *